(12) United States Patent
Noguchi

(10) Patent No.: US 10,641,223 B2
(45) Date of Patent: May 5, 2020

(54) ATTACHMENT STRUCTURE OF FUEL INJECTION DEVICE NOZZLE PLATE

(71) Applicant: Enplas Corporation, Saitama (JP)

(72) Inventor: Koji Noguchi, Saitama (JP)

(73) Assignee: Enplas Corporation, Saitama (JP)

(*) Notice: Subject to any disclaimer, the term of this patent is extended or adjusted under 35 U.S.C. 154(b) by 160 days.

(21) Appl. No.: 15/025,718

(22) PCT Filed: Sep. 19, 2014

(86) PCT No.: PCT/JP2014/074787
§ 371 (c)(1),
(2) Date: Mar. 29, 2016

(87) PCT Pub. No.: WO2015/050003
PCT Pub. Date: Apr. 9, 2015

(65) Prior Publication Data
US 2016/0245250 A1    Aug. 25, 2016

(30) Foreign Application Priority Data

Oct. 1, 2013 (JP) .................................. 2013-206034
Oct. 10, 2013 (JP) .................................. 2013-212499

(51) Int. Cl.
*F02M 61/18* (2006.01)
*F02M 61/14* (2006.01)
(Continued)

(52) U.S. Cl.
CPC ........ *F02M 61/145* (2013.01); *F02M 61/166* (2013.01); *F02M 61/168* (2013.01);
(Continued)

(58) Field of Classification Search
CPC ............. F02M 61/145; F02M 61/1853; F02M 61/168; F02M 61/166; F02M 2200/80;
(Continued)

(56) References Cited

U.S. PATENT DOCUMENTS 3,594,876 A * 7/1971 Gunther ................. F16B 21/04
411/555
4,305,180 A * 12/1981 Schwartz ............... F16B 21/04
285/396
(Continued)

FOREIGN PATENT DOCUMENTS

JP 2-90134 3/1990
JP 3-160151 7/1991
(Continued)

OTHER PUBLICATIONS

International Search Report dated Oct. 28, 2014 in corresponding International Application No. PCT/JP2014/074787 (with English translation).

Primary Examiner — David Hamaoui
(74) Attorney, Agent, or Firm — Wenderoth, Lind & Ponack, L.L.P.

(57) ABSTRACT

An engaging projection of a valve body engages with an interlocking groove of a nozzle plate and the nozzle plate is rotated relative to the valve body. The engaging projection moves in a lateral groove of the interlocking groove while elastically deforming an arm part (elastically deformable portion), and the engaging projection is accommodated in a recess (lock position in the interlocking groove) of the arm part. A bottom surface of the recess of the arm part is pushed against the engaging projection of the valve body by the elastic force of the arm part, and the engaging projection of the valve body is seated and fixed on the bottom surface of the recess of the arm part. Accordingly, the nozzle plate is fixed to the valve body while being retained via the engaging projection and the interlocking groove (interlocking means).

6 Claims, 30 Drawing Sheets

(51) Int. Cl.
*F02M 61/16* (2006.01)
*F16B 21/18* (2006.01)
*F16B 21/04* (2006.01)

(52) U.S. Cl.
CPC ..... *F02M 61/1853* (2013.01); *F02M 2200/80* (2013.01); *F16B 21/04* (2013.01); *F16B 21/18* (2013.01)

(58) Field of Classification Search
CPC ........ F16B 21/18; F16B 21/04; F16B 5/0092; F16B 5/10; F16B 7/20
See application file for complete search history.

(56) References Cited

U.S. PATENT DOCUMENTS

| | | | | |
|---|---|---|---|---|
| 4,464,001 A * | 8/1984 | Collins | ............... | H01R 13/625 439/318 |
| 4,708,370 A * | 11/1987 | Todd | ............... | F16L 25/0045 277/615 |
| 4,737,119 A * | 4/1988 | Stieler | ............... | H01R 13/625 439/318 |
| 4,771,948 A * | 9/1988 | Furukawa | ............ | F02M 51/0675 239/533.12 |
| 4,773,374 A * | 9/1988 | Kiuchi | ............... | F02M 51/0678 123/470 |
| 4,925,110 A * | 5/1990 | Takeda | ............... | F02M 51/0678 239/533.12 |
| 4,945,877 A * | 8/1990 | Ziegler | ............... | F02M 51/061 123/472 |
| 5,085,369 A | 2/1992 | Aoki et al. | | |
| 5,397,196 A * | 3/1995 | Boiret | ............... | F16B 21/04 285/360 |
| 5,741,084 A * | 4/1998 | Del Rio | ............... | A61B 17/1633 285/361 |
| 5,868,533 A * | 2/1999 | Fiala | ............... | B23B 31/113 279/93 |
| 6,226,068 B1 * | 5/2001 | Arcykiewicz | ........ | H01R 13/625 439/314 |
| 6,619,264 B2 * | 9/2003 | Bolsover | ............... | B29C 33/52 123/456 |
| 7,107,969 B2 * | 9/2006 | Norcutt | ............... | F02M 55/02 123/470 |
| 7,161,111 B2 * | 1/2007 | Schneider | ............... | H05H 1/34 219/121.39 |
| 7,694,853 B2 * | 4/2010 | Keller | ............... | B65D 81/325 215/332 |
| 7,828,232 B2 * | 11/2010 | Oomori | ............... | F02M 51/061 239/104 |
| 8,287,007 B2 * | 10/2012 | Reiter | ............... | F02M 51/0682 285/239 |
| 2016/0237968 A1 * | 8/2016 | Noguchi | ............ | F02M 61/168 |

FOREIGN PATENT DOCUMENTS

| | | | |
|---|---|---|---|
| JP | 8-82271 | 3/1996 | |
| JP | 11-270438 | 10/1999 | |
| JP | 2008-138714 | 6/2008 | |
| JP | 2010-242548 | 10/2010 | |
| JP | 2011-144731 | 7/2011 | |
| WO | WO 2015046029 A1 * | 4/2015 | ........ F02M 61/1853 |

* cited by examiner

ATTACHMENT STRUCTURE OF FUEL INJECTION DEVICE NOZZLE PLATE

TECHNICAL FIELD

The present invention relates to an attachment structure of a fuel injection device nozzle plate (abbreviated below as a nozzle plate) used to atomize and inject fuel flowing from a fuel injection port of a fuel injection device.

BACKGROUND ART

An internal combustion (abbreviated below as an engine) of an automobile or the like mixes fuel injected from a fuel injection device and air introduced via an intake air pipe to generate a combustible gas mixture and burns the combustible gas mixture in the cylinder. It is known that the mixture state of fuel injected from the fuel injection device and air significantly affects the performance of this type of engine and, in particular, the atomization of fuel injected from the fuel injection device is an important factor governing the performance of the engine.

Accordingly, as illustrated in FIG. 30, a conventional fuel injection device 1000 promotes the atomization of fuel by welding a nozzle plate 1003 of metal to a valve body 1002 of metal having a fuel injection port 1001 and injecting the fuel injected from the fuel injection port 1001 into an intake air pipe via nozzle holes 1004 formed in the nozzle plate 1003 (see JP-A-11-270438 and JP-A-2011-144731).

However, the conventional fuel injection device 1000 needs to use a masking jig for welding to prevent welding spatter from entering the nozzle holes 1004 of the nozzle plate 1003 and blocking the nozzle holes 1004, so efficient welding is difficult. As a result, the manufacturing man-hours of the conventional fuel injection device 1000 increases, making it difficult to reduce the manufacturing cost.

An object of the invention is to provide the attachment structure of a fuel injection device nozzle plate for enabling reduction in the manufacturing man-hours and manufacturing cost of a fuel injection device.

SUMMARY OF THE INVENTION

The invention relates to the attachment structure of fuel injection device nozzle plates 3 and 103 having nozzle holes 7 and 107 for atomizing and injecting fuel flowing from fuel injection ports 4 and 104 of fuel injection devices 1 and 101. In the invention, metal valve bodies 5 and 105 of the fuel injection devices 1 and 101 have front end sides to which the fuel injection device nozzle plates 3 and 103 are attachable, the front end sides being provided with the fuel injection ports 4 and 104. The fuel injection device nozzle plates 3 and 103 include cylindrical fitting parts 12 and 112 into which the front end sides of the valve bodies 5 and 105 are fitted and bottom wall parts 14 and 114 formed so as to block one end sides of the cylindrical fitting parts 12 and 112, the bottom wall parts 14 and 114 abutting against front end surfaces 13 and 113 of the valve bodies 5 and 105 and having the nozzle holes 7 and 107. The cylindrical fitting parts 12 and 112 and the bottom wall parts 14 and 114 of the fuel injection device nozzle plates 3 and 103 are made of synthetic resin and formed integrally. The cylindrical fitting parts 12 and 112 have elastically deformable portions elastically deformable in parts of the other end sides, are fitted onto the front end sides of the valve bodies 5 and 105 until the bottom wall parts 14 and 114 abut against the front end surfaces 13 and 113 of the valve bodies 5 and 105, and are fixed to the valve bodies 5 and 105 while being retained via interlocking means when the elastically deformable portions are elastically deformed by engaging with parts of the interlocking means. The elastically deformable portions are arm parts 20 or U-ring supporting portions 135. The interlocking means indicates an interlocking groove 23 of the cylindrical fitting part 12 and an engaging projection 8 of a valve body 5 engaging with the interlocking groove 23, an interlocking groove 38 of the valve body 5 and an engaging projection 37 of the arm part 20 engaging with the interlocking groove 38, or an interlocking groove 108 of the valve body 105 and a U-ring 110 engaging with the interlocking groove 108. In addition, a part of the interlocking means is the engaging projection 8, the interlocking groove 38, or the U-ring 110.

Advantageous Effects of Invention

In the attachment structure of a fuel injection device nozzle plate according to the invention, since the elastically deformable portion of the cylindrical fitting part is elastically deformed by engaging with a part of the interlocking means and the cylindrical fitting part is fixed to the valve body via the interlocking means while being retained, the manufacturing man-hours and manufacturing cost of the fuel injection device can be reduced as compared with a conventional example in which a nozzle plate of metal is fixed to the front end of a valve body of metal by welding.

BRIEF DESCRIPTION OF DRAWINGS

FIG. 2A is a front view illustrating the front end side of a fuel injection device, FIG. 2B is a side view illustrating the front end side of the fuel injection device seen from the direction indicated by arrow C1 in FIG. 2A, FIG. 2C is a cross sectional view illustrating the front end side of the fuel injection device taken along line A1-A1 in the nozzle plate in FIG. 2A, and FIG. 2D is a cross sectional view illustrating the front end side of the fuel injection device taken along line A1-A1 in the entire fuel injection device in FIG. 2A.

FIG. 3A is a front view illustrating the nozzle plate, FIG. 3B is a side view illustrating the nozzle plate seen from the direction indicated by arrow C2 in FIG. 3A, FIG. 3C is a cross sectional view illustrating the nozzle plate taken along line A2-A2 in FIG. 3A, FIG. 3D is a cross sectional view illustrating the nozzle plate taken along line A3-A3 in FIG. 3B, and FIG. 3E illustrates a modification of the arm part of the nozzle plate.

FIG. 4A is a front view illustrating the front end side of a valve body 5, FIG. 4B is a side view illustrating the front end side of the valve body 5 seen from the direction indicated by arrow C3 in FIG. 4A, and FIG. 4C is a side view illustrating the front end side of the valve body 5 seen from the direction indicated by arrow C4 in FIG. 4B.

FIG. 9A is a front view illustrating the front end side of a fuel injection device, FIG. 9B is a side view illustrating the front end side of the fuel injection device seen from the direction indicated by arrow C4 in FIG. 9A, FIG. 9C is a cross sectional view illustrating the front end side of the fuel injection device taken along line A4-A4 in the nozzle plate in FIG. 9A, and FIG. 9D is a plan view illustrating an engaging projection seen from the direction indicated by F in FIG. 9C.

FIG. 10A is a front view illustrating the nozzle plate, FIG. 10B is a side view illustrating the nozzle plate seen from the direction indicated by arrow C5 in FIG. 10A, and FIG. 10C is a cross sectional view illustrating the nozzle plate taken along line A5-A5 in FIG. 10A.

FIG. 11A is a front view illustrating the front end side of the valve body, and FIG. 11B is a side view illustrating the front end side of the valve body.

FIG. 12A is a front view illustrating a nozzle plate, and FIG. 12B is a cross sectional view illustrating the nozzle plate taken along line A6-A6 in FIG. 12A.

FIG. 14A is a front view illustrating the front end side of a valve body, and FIG. 14B is a side view illustrating the front end side of the valve body.

FIG. 17A is a front view illustrating the front end side of a valve body, and FIG. 17B is a side view illustrating the front end side of the valve body.

FIG. 19A is a front view illustrating the front end side of a fuel injection device, FIG. 19B is a side view illustrating the front end side of the fuel injection device seen from the direction indicated by arrow C101 in FIG. 19A, FIG. 19C is a cross sectional view illustrating the front end side of the fuel injection device taken along line A101-A101 in the nozzle plate in FIG. 19A, and FIG. 19D is a cross sectional view illustrating the front end side of the fuel injection device taken along line A101-A101 in the entire fuel injection device in FIG. 19A.

FIG. 21A is a front view illustrating the nozzle plate, FIG. 21B is a side view illustrating the nozzle plate seen from the direction indicated by arrow C102 in FIG. 21A, FIG. 21C is a side view illustrating the nozzle plate seen from the direction indicated by arrow C103 in FIG. 21A, FIG. 21D is a cross sectional view illustrating the nozzle plate taken along line A103-A103 in FIG. 21A, and FIG. 21E is a cross sectional view illustrating the nozzle plate taken along line A104-A104 in FIG. 21B.

FIG. 22A is a front view illustrating the valve body and FIG. 22B is a side view illustrating the front end side of the valve body.

FIG. 23A is a plan view illustrating the U-ring and FIG. 23B is a side view illustrating the U-ring.

FIG. 24A is a front view of the front end side of a fuel injection device, FIG. 24B is a side view illustrating the front end side of the fuel injection device seen from the direction indicated by arrow C104 in FIG. 24A, and FIG. 24C is a cross sectional view illustrating the front end side of the fuel injection device taken along line A105-A105 in the nozzle plate in FIG. 24A.

FIG. 25A is a plan view illustrating the U-ring and FIG. 25B is a side view illustrating the U-ring.

FIG. 26A is a front view illustrating the front end side of a fuel injection device, FIG. 26B is a side view illustrating the front end side of the fuel injection device seen from the direction indicated by arrow C105 in FIG. 26A, and FIG. 26C is a cross sectional view illustrating the front end side of the fuel injection device taken along line A106-A106 in the nozzle plate in FIG. 26A.

FIG. 27A is a front view illustrating the valve body and FIG. 27B is a side view illustrating the front end side of the valve body.

DETAILED DESCRIPTION OF EMBODIMENTS OF THE INVENTION

Embodiments of the invention will be described in detail below with reference to the drawings.

First Embodiment (Fuel Injection Device)

Figure 1:
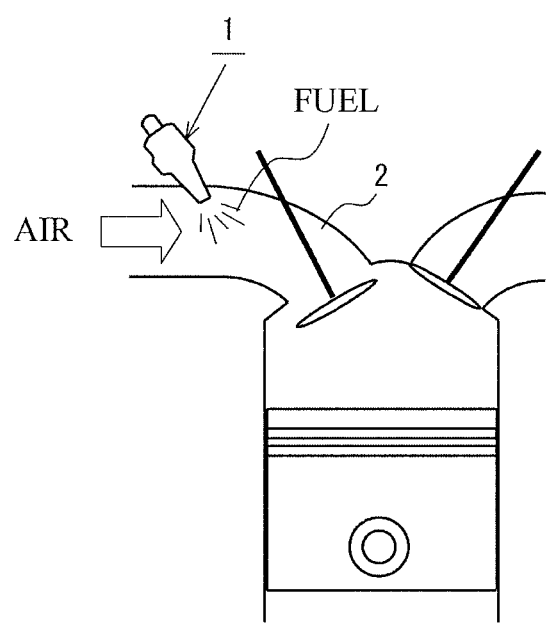
FIG. 1 schematically illustrates the use state of a fuel injection device.
Figure 2A:
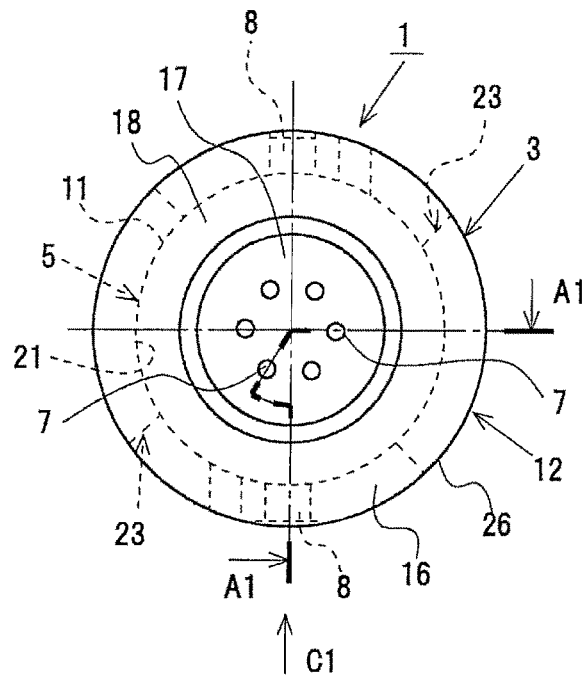
FIGS. 2A-2D illustrate an attachment structure of a nozzle plate according to a first embodiment of the invention.
Figure 2C:
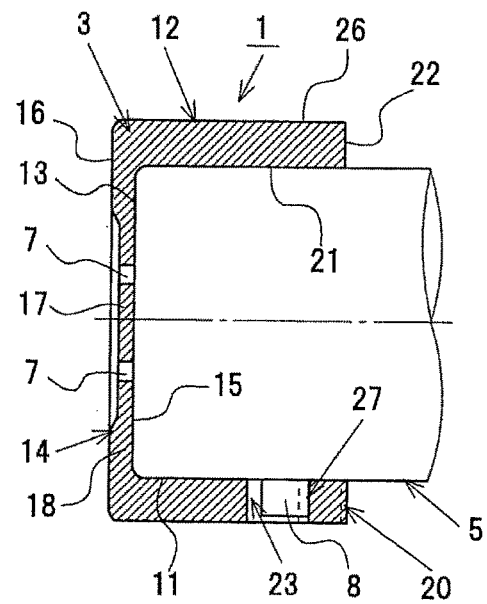
Figure 2B:
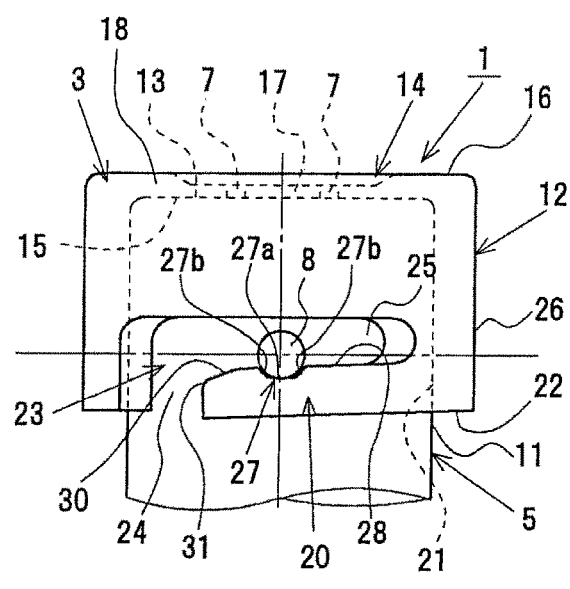
Figure 2D:
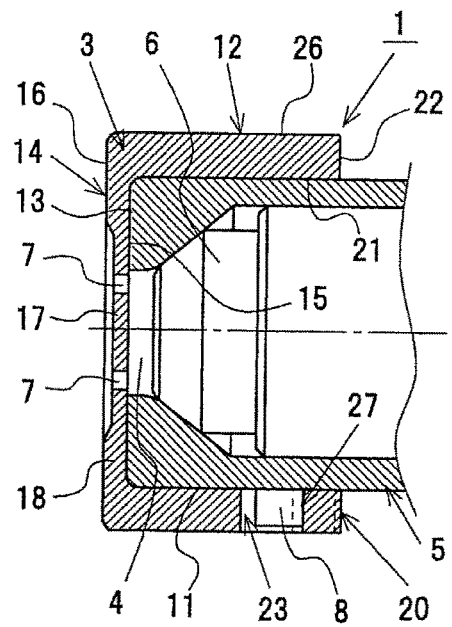

FIG. 1 schematically illustrates the use state of a fuel injection device 1 (see FIG. 2). As illustrated in FIG. 1, the fuel injection device 1 of port injection type is installed at an intermediate point on an intake air pipe 2 of an engine, injects fuel into the intake air pipe 2, mixes air introduced to the intake air pipe 2 and the fuel, and generates a combustible gas mixture.

FIG. 2 illustrates the front end side of the fuel injection device 1 to which a fuel injection device nozzle plate 3 (abbreviated below as the nozzle plate) has been attached. FIG. 2A is a front view illustrating the front end side of the fuel injection device 1, and FIG. 2B is a side view illustrating the front end side of the fuel injection device 1 seen from the direction indicated by arrow C1 in FIG. 2A. In addition, FIG. 2C is a cross sectional view illustrating the front end side of the fuel injection device 1 taken along line A1-A1 in the nozzle plate 3 in FIG. 2A. In addition, FIG. 2D is a cross sectional view illustrating the front end side of the fuel injection device 1 taken along line A1-A1 in the entire fuel injection device in FIG. 2A.

As illustrated in FIG. 2, in the fuel injection device 1, the nozzle plate 3 of synthetic resin is attached to the front end side of the valve body 5 of metal in which a fuel injection port 4 is formed. The fuel injection device 1 has a needle valve 6 opened or closed by a solenoid (not illustrated). When the needle valve 6 is opened, fuel in the valve body 5 is injected from the fuel injection port 4, and the fuel injected from the fuel injection port 4 is injected externally via nozzle holes 7 of the nozzle plate 3. The valve body 5 is circular in front view (see FIG. 4A), and a pair of round-bar-shaped engaging projections 8 is formed at intervals of 180 degrees in the circumferential direction on an outer peripheral surface 11 on the front end side (see FIGS. 4A to 4C). The nozzle plate 3 is injection-molded using synthetic resin such as PPS, PEEK, POM, PA, PES, PEI, or LCP.

(Attachment Structure of Nozzle Plate)

Figure 3A:
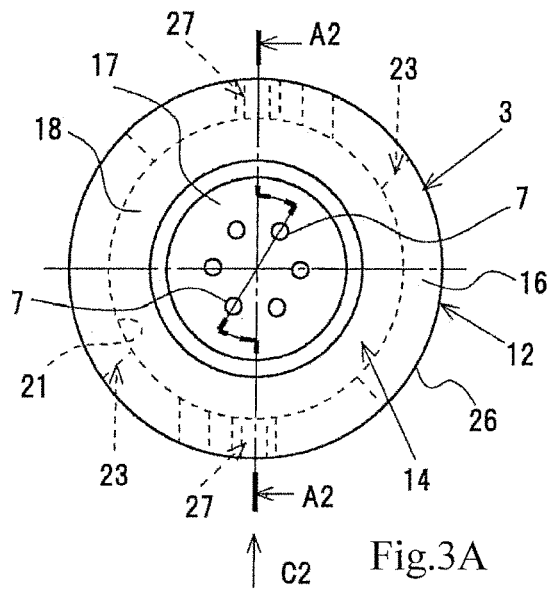
FIGS. 3A-3E illustrate the nozzle plate according to the first embodiment of the invention.
Figure 3D:
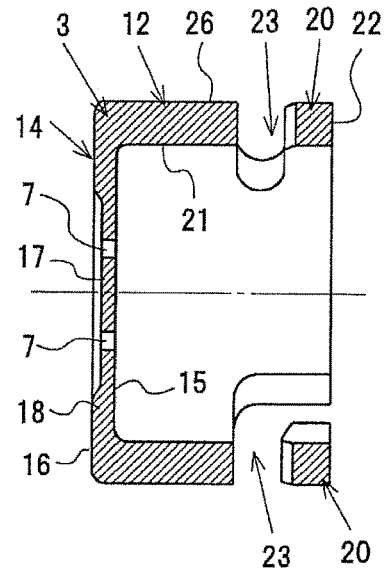
Figure 3B:
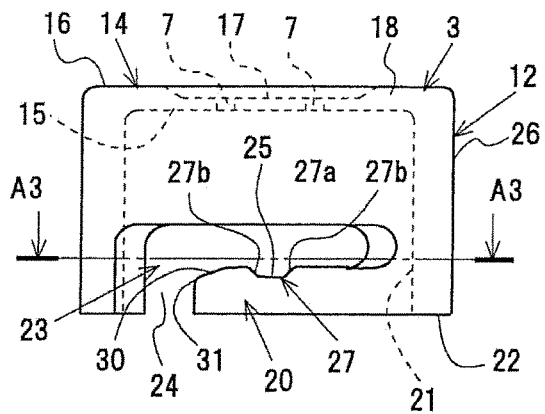
Figure 3C:
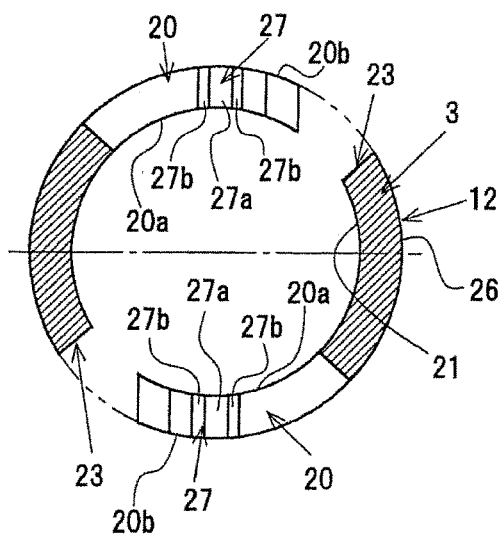
Figure 3E:
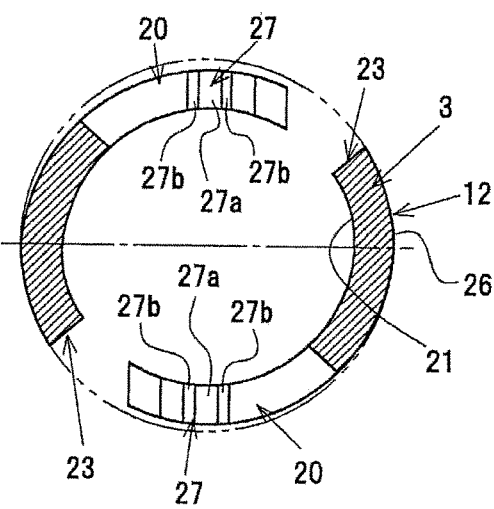
Figure 4A:
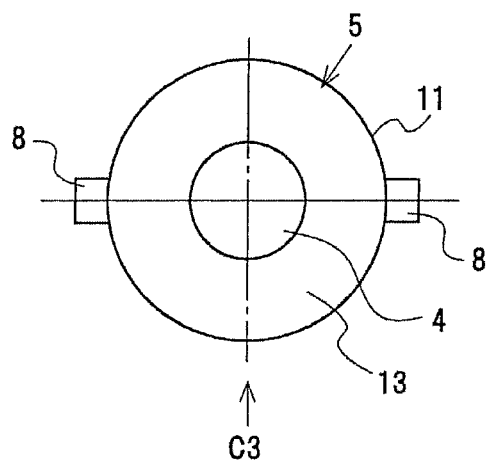
FIGS. 4A-4C illustrate a valve body according to the first embodiment of the invention.
Figure 4B:
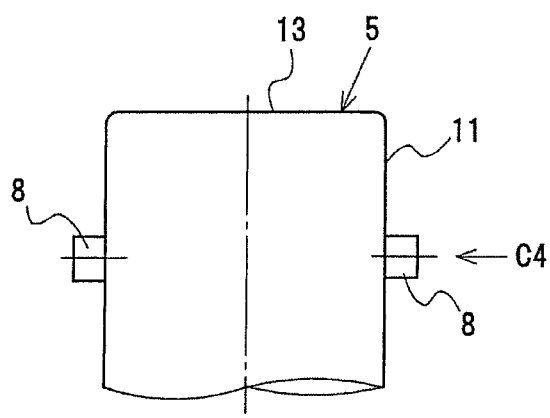
Figure 4C:
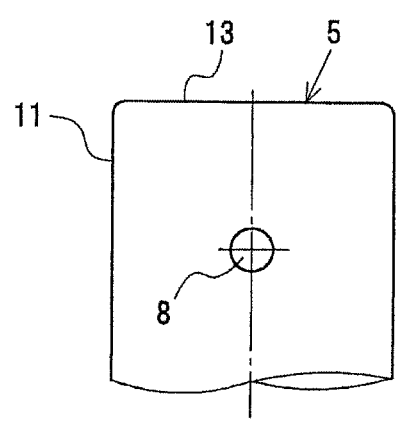

The attachment structure of the nozzle plate 3 according to the embodiment will be described with reference to FIGS. 2 to 4. FIG. 3A is a front view illustrating the nozzle plate 3, FIG. 3B is a side view illustrating the nozzle plate 3 seen from the direction indicated by arrow C2 in FIG. 3A, FIG. 3C is a cross sectional view illustrating the nozzle plate 3 taken along line A2-A2 in FIG. 3A, and FIG. 3D is a cross sectional view illustrating the nozzle plate 3 taken along line A3-A3 in FIG. 3B. FIG. 4A is a front view illustrating the front end side of the valve body 5, FIG. 4B is a side view illustrating the front end side of the valve body 5 seen from the direction indicated by arrow C3 in FIG. 4A, and FIG. 4C is a side view illustrating the front end side of the valve body 5 seen from the direction indicated by arrow C4 in FIG. 4B.

As illustrated in FIGS. 2A to 4C, the nozzle plate 3 is a bottomed cylindrical body integrally having a cylindrical fitting part 12 to be fitted onto the front end side outer peripheral surface 11 of the valve body 5, and a bottom wall part 14 formed so as to block one end side of the cylindrical fitting part 12, the bottom wall part 14 abutting against the front end surface 13 of the valve body 5.

The bottom wall part 14 has the plurality of nozzle holes 7 (six nozzle holes at regular intervals in the circumferential direction) for injecting fuel injected from the fuel injection port 4 of the fuel injection device 1 externally (into the intake air pipe 2). An inner surface 15 (surface in close contact with the front end surface 13 of the valve body 5) of the bottom wall part 14 is flat, and an outer surface 16 is recessed in a central part 17. That is, in the bottom wall part 14, the central part 17 in which the nozzle holes 7 are formed is a discoid thin-walled part and an outer periphery part 18, surrounding the central part 17, that connects to one end side of the cylindrical fitting part 12 is a thick-walled part, which is thicker than the central part 17. Although the number of the nozzle holes 7 formed in the bottom wall part 14 is six in the embodiment, the invention is not limited to the embodiment and the number of holes and the diameter of holes may be determined as appropriate according to requested fuel injection characteristics.

The cylindrical fitting part 12 is formed so that the entire body except the arm part 20, which will be described later, is substantially cylindrical and has an inner peripheral surface 21 into which the front end side of the valve body 5 is to be fitted. The cylindrical fitting part 12 has one end blocked by the bottom wall part 14 and the other end (an open end 22) into which the front end side of the valve body 5 can be inserted.

The cylindrical fitting part 12 is provided with a pair of interlocking grooves 23 in the part close to the open end 22 so as to correspond to a pair of engaging projections 8 and 8 of the valve body 5. That is, the pair of interlocking grooves 23 and 23 is formed at intervals of 180 degrees in the circumferential direction of the cylindrical fitting part 12. The interlocking groove 23 includes an axial groove part 24 extending in the bus line direction (the direction in which the valve body 5 is fitted into the cylindrical fitting part 12) from the opening end (the other end) 22 of the cylindrical fitting part 12, and a lateral groove part 25 extending in the circumferential direction from the end part of the axial groove 24. The axial groove part 24 and the lateral groove part 25 penetrate from an outer peripheral surface 26 to an inner peripheral surface 21 of the cylindrical fitting part 12. Thus, cylindrical fitting part 12 has an arm part 20 formed between the open end (the other end) 22 and the lateral groove part 25 as a bendable (elastically deformable) cantilever. That is, the arm part 20 is an elastically deformable portion formed in the cylindrical fitting part 12 and is elastically deformable in the radial direction and the bus line direction of the cylindrical fitting part 12.

The arm part 20 is provided with a recess 27 for accommodating the engaging projection 8 of the valve body 5 on the groove wall 28 forming a part of the contour of the lateral groove 25. As shown in, for example, FIG. 2B, the recess 27 is formed at roughly the midpoint of the lateral groove wall 28 so as to be spaced apart a distance (the distance at least equal to the lateral width of the projection 8) from both the base end and the terminal end of the lateral groove portion 25. The recess 27 is formed, like a trapezoid, by a flat bottom surface 27a on which the round-bar-shaped engaging projection 8 is seated and a pair of inclined surfaces 27b and 27b extending toward the groove wall 28 from both ends of the bottom surface 27a. The recess 27 functions as a lock position at which the engaging projection 8 of the valve body 5 is positioned and fixed. The pair of inclined surfaces 27b and 27b are formed to have a spacing increasing toward the groove wall 28 from the bottom surface 27a so that the engaging projection 8 moving along the groove wall 28 can be smoothly guided to the bottom surface 27a of the recess 27.

In addition, the arm part 20 is formed so that its inner surface 20a and the inner peripheral surface 21 of the cylindrical fitting part 12 are present in the same circumference and its outer surface 20b and the outer peripheral surface 26 of the cylindrical fitting part 12 are present in the same circumference as illustrated in FIG. 3D. As illustrated in FIG. 3E, the pair of arm parts 20 may be formed so that at least their front end sides are positioned radially inward of the inner peripheral surface 21 of the cylindrical fitting part 12. Since the front end sides are positioned radially inward of the inner peripheral surface 21 of the cylindrical fitting part 12, the pair of arm parts 20 and 20 formed in this way can hold the outer peripheral surface 11 of the valve body 5 so as to surround it. In addition, the arm part 20 is preferably formed so that the amount of radially inward displacement gradually increases as traveling from the base end side to the front end side, as illustrated in FIG. 3E.

The part of the groove wall 28 extending from the recess 27 to the axial groove 24, the part being a part of the arm parts 20, includes an inclined plane 30 approaching the opening end (the other end) 22 of the cylindrical fitting part 12 toward the axial groove 24 from the vicinity of the recess 27 and a curved surface 31 smoothly connecting the inclined plane 30 to the axial groove 24, so that the engaging projection 8 of the valve body 5 can smoothly move in the recess 27 while bending the arm part 20.

(Assembling of Nozzle Plate and Valve Body)

As evident from the drawings and the following description, the axial groove part 24 and the lateral groove part 25 of the interconnecting groove 23 have a width at least as large as the lateral and axial width of the engaging projection 8 to allow the engaging projection 8 to pass through the interconnection groove 23 as the nozzle plate 3 is attached to the valve body 5. When assembling the valve body 5 to the cylindrical fitting part 12 of the nozzle plate 3, in the state in which the front end side of the valve body 5 is inserted into the cylindrical fitting part 12 from the opening end 22 of the cylindrical fitting part 12 and the engaging projection 8 of the valve body 5 engages with the axial groove 24 of the cylindrical fitting part 12, the front end side of the valve body 5 is pushed into the cylindrical fitting part 12 along the axial groove 24 until the front end surface 13 of the valve body 5 makes contact with the bottom wall part 14 of the nozzle plate 3. Next, in the state in which the front end surface 13 of the valve body 5 makes contact with the bottom wall part 14 of the nozzle plate 3, the cylindrical fitting part 12 of the nozzle plate 3 is rotated relative to the valve body 5. At this time, the engaging projection 8 of the valve body 5 slides and moves in the lateral groove 25 while moderately bending the arm part 20 outward (while bending the arm part 20 in a direction in which the groove width of the lateral groove 25 is extended). Since the engaging projection 8 of the valve body 5 is accommodated in the recess 27 of the arm part 20 while receiving the elastic force of the arm part 20 and the bottom surface 27a of the recess 27 is pushed against the engaging projection 8 of the valve body 5 by the elastic force of the arm part 20, the engaging projection 8 of the valve body 5 is seated (in contact with) and fixed on the bottom surface 27a of the recess 27. The interlocking groove 23 of the cylindrical fitting part 12 and the engaging projection 8 of the valve body 5 form interlocking means for fixing the cylindrical fitting part 12 to the valve body 5 while being retained.

(Effect of First Embodiment)

In the attachment structure of the nozzle plate 3 according to the embodiment, when the engaging projection 8 of the valve body 5 engages with the interlocking groove 23 of the nozzle plate 3 and the nozzle plate 3 is rotated relative to the valve body 5, the engaging projection 8 moves in the lateral groove 25 of the interlocking groove 23 while elastically deforming (bending) the arm part 20, the engaging projection 8 is accommodated in the recess 27 (the lock position in the interlocking groove 23) of the arm part 20, the bottom surface 27a of the recess 27 of the arm part 20 is pushed against the engaging projection 8 of the valve body 5 by the elastic force of the arm part 20, and the engaging projection 8 of the valve body 5 is seated and fixed on the bottom surface 27a of the recess 27 of the arm part 20. That is, in the attachment structure of the nozzle plate 3 according to the embodiment, the nozzle plate 3 is fixed to the valve body 5 while being retained since the engaging projection 8 of the valve body 5 is fixed to the inside of the recess 27 (the lock position in the interlocking groove 23) of the arm part 20 by the elastic force of the arm part 20. Accordingly, in the attachment structure of the nozzle plate 3 according to the embodiment, the manufacturing man-hours and manufacturing cost of the fuel injection device 1 can be reduced as compared with the conventional example (see FIG. 18) in which the nozzle plate 103 of metal is fixed to the front end of the valve body 102 of metal by welding.

In addition, in the attachment structure of the nozzle plate 3 according to the embodiment, when a difference in thermal expansion is generated between the nozzle plate 3 of synthetic resin and the valve body 5 of metal after the nozzle plate 3 is attached to the valve body 5, the arm part 20 is elastically deformed to absorb the difference in thermal expansion between the nozzle plate 3 and the valve body 5, the elastic force of the arm part 20 continuously pushes the bottom surface 27a of the recess 27 against the engaging projection 8 of the valve body 5 and the elastic force (the force caused by the elastic deformation of the arm part 20) pushing the bottom wall part 14 of the nozzle plate 3 against the front end surface 13 of the valve body 5 is constantly applied, so no space is generated between the bottom wall part 14 of the nozzle plate 3 and the front end surface 13 of the valve body 5. Accordingly, even when the injection pressure of fuel acts on the nozzle plate 3, the nozzle plate 3 is not removed from the valve body 5 and the nozzle plate 3 achieves a desired function (function of atomizing fuel). Since the nozzle plate 3 of synthetic resin has a thermal expansion rate larger than in the valve body 5 of metal, the thermal expansion of the nozzle plate 3 is larger than in the valve body 5 of metal.

In addition, in the attachment structure of the nozzle plate 3 according to the embodiment, when the valve body 5 and the nozzle plate 3 have manufacturing error, the arm part 20 is elastically deformed to absorb the manufacturing error of the nozzle plate 3 and the valve body 5, the elastic force of the arm part 20 continuously pushes the bottom surface 27a of the recess 27 against the engaging projection 8 of the valve body 5, the elastic force (the force caused by the elastic deformation of the arm part 20) of the arm part 20 constantly pushes the bottom wall part 14 of the nozzle plate 3 against the front end surface 13 of the valve body 5, so no space is generated between the bottom wall part 14 of the nozzle plate 3 and the front end surface 13 of the valve body 5. Accordingly, the nozzle plate 3 is not removed from the valve body 5 even when the injection pressure of fuel acts on the nozzle plate 3 and the nozzle plate 3 achieves a desired function (function of atomizing fuel).

In addition, in the attachment structure of the nozzle plate 3 according to the embodiment, since the engaging projection 8 of the valve body 5 is fixed to the inside of the recess 27 (the lock position in the interlocking groove 23) of the arm part 20 by the elastic force of the arm part, the nozzle plate 3 is fixed to the valve body 5 while being retained. Accordingly, in the attachment structure of the nozzle plate 3 according to the embodiment, a failure (nozzle holes 104 are blocked by welding spatter) does not occur unlike the conventional example (see FIG. 18) in which the nozzle plate 103 of metal is fixed to the front end of the valve body 102 of metal by welding and all nozzle holes 7 surely achieve the function of atomizing fuel.

In the present embodiment, the engaging projection 8 is formed integrally with the valve body 5 or formed separately from the valve body 5 and then fixed to the valve body 5.

(Modification 1 of First Embodiment)

Figure 5:
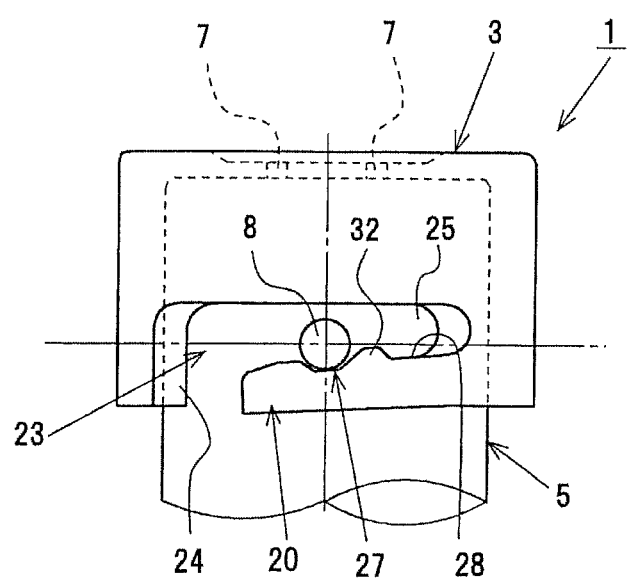
FIG. 5 illustrates an attachment structure of a nozzle plate according to modification 1 of the first embodiment.

FIG. 5 is a diagram illustrating an attachment structure of the nozzle plate 3 according to modification 1 of a first embodiment. As illustrated in FIG. 5, in the attachment structure of the nozzle plate 3 according to the modification, when the edge of the recess 27 of the arm part 20 close to the axial groove 24 is assumed to be a front recess edge and the edge of the recess 27 away from the axial groove 24 is assumed to be a rear recess edge, the part of the groove wall 28, forming the lateral groove 25, that is close to the arm part 20 is provided with a rotation preventing projection 32, projecting toward the inside of the lateral groove 25, that is connected to the rear recess edge.

The attachment structure of the nozzle plate 3 according to the modification prevents the over rotation of the nozzle plate 3 relative to the valve body 5 using the rotation preventing projection 32 and surely accommodates the engaging projection 8 of the valve body 5 in the recess 27.

In addition, the attachment structure of the nozzle plate 3 according to the modification prevents the over rotation of the nozzle plate 3 relative to the valve body 5 using the rotation preventing projection 32 and surely accommodates the engaging projection 8 of the valve body 5 in the recess 27 of the arm part 20, so the nozzle holes 7 of the nozzle plate 3 can be positioned with respect to the valve body 5. Accordingly, fuel can be accurately injected in a desired injection direction from the nozzle holes 7.

(Modification 2 of First Embodiment)

Figure 6A:
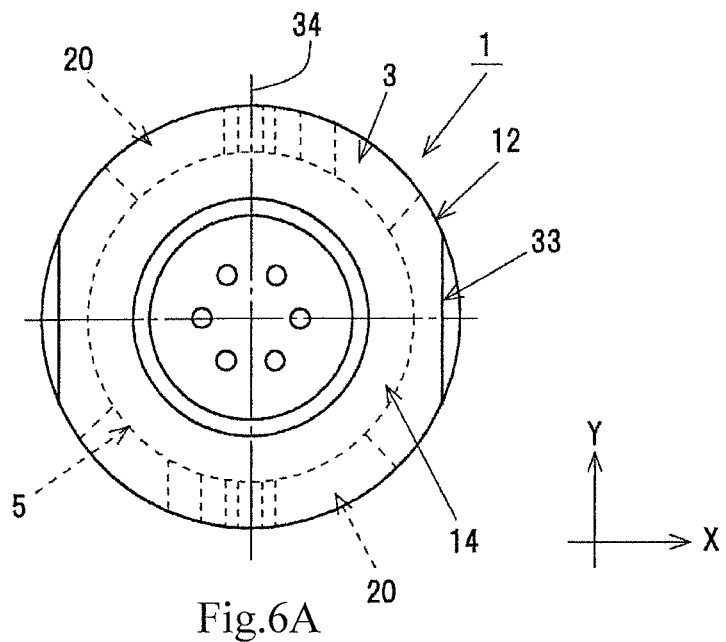
FIG. 6 illustrates an attachment structure of a nozzle plate according to modification 2 of the first embodiment.
Figure 6B:
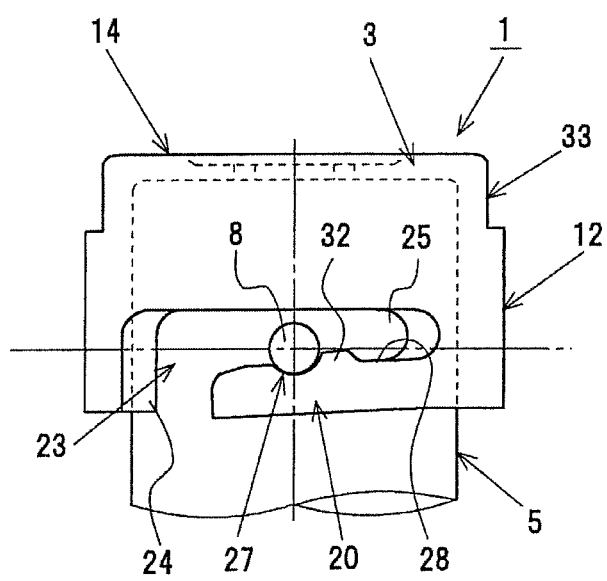

FIG. 6 is a diagram illustrating an attachment structure of the nozzle plate 3 according to modification 2 of the first embodiment. FIG. 6A is a front view illustrating the front end side of the fuel injection device 1 and FIG. 6B is a side view illustrating the front end side of the fuel injection device 1.

As illustrated in FIG. 6, the attachment structure of the nozzle plate 3 according to the modification is different from those according to the first embodiment and modification 1 in which the shape of the recess 27 is trapezoidal in that the shape of the recess 27 formed in the arm part 20 is substantially a semicircle having a curvature radius slightly larger than that of the engaging projection 8.

In the substantially semicircular recess 27 according to the modification, the space between the recess 27 and the round-bar-shaped engaging projection 8 can be smaller than in the trapezoidal recess 27 according to the first embodiment and modification 1 and the round-bar-shaped engaging projection 8 can be accurately positioned and held. In the modification, the rotation preventing projection 32 similar to that in modification 1 is provided.

In addition, the modification is provided with width across flat parts 33 formed by partially cutting one end side (close to the bottom wall part 14) of the cylindrical fitting part 12. The width across flat parts 33 are formed symmetrically with respect to a central line 34 in parallel with the Y-axis as illustrated in FIG. 6A. Since the width across flat parts 33 are formed on the one end side of the cylindrical fitting part 12 and the nozzle plate 3 can be rotated relative to the valve body 5 while grasping the width across flat parts 33 during relative rotation of the nozzle plate 3 and the valve body 5, it is easy to apply a force in the rotation direction to the nozzle plate 3 and assemble the nozzle plate 3 to the valve body 5. In addition, since the nozzle plate 3 according to the modification has the width across flat parts 33 on the one end side of the cylindrical fitting part 12, the nozzle plate 3 can be assembled to the valve body 5 by positioning the nozzle plate 3 relative to the valve body 5 using the width across flat parts 33 as a guide.

(Modification 3 of First Embodiment)

Figure 7:
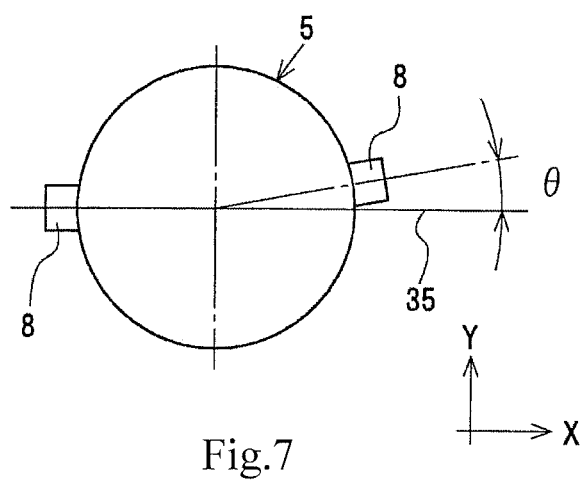
FIG. 7 illustrates an attachment structure of a valve body according to modification 3 of the first embodiment.
Figure 8A:
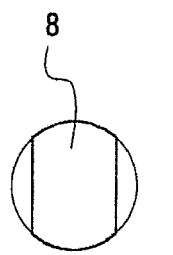
FIGS. 8A-8D illustrate a modification of an engaging projection according to the first embodiment.
Figure 8B:
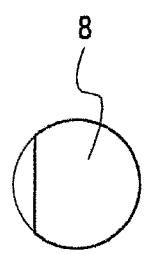
Figure 8C:
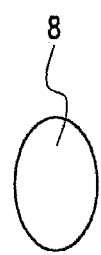
Figure 8D:
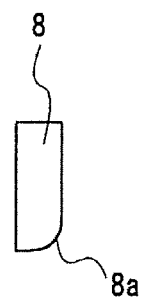
Figure 9A:
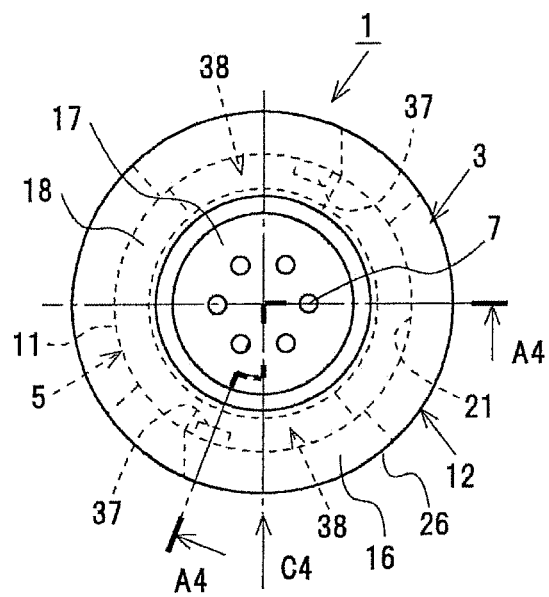
FIGS. 9A-9D illustrate an attachment structure of a nozzle plate according to a second embodiment of the invention.
Figure 9C:
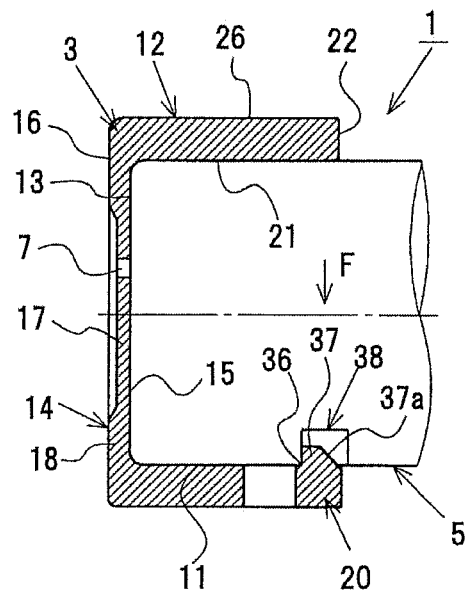
Figure 9B:
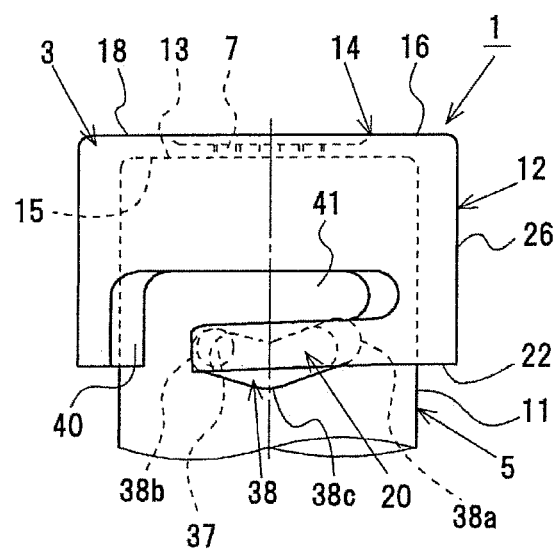
Figure 9D:
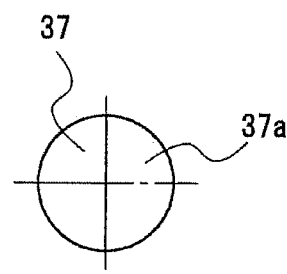

FIG. 7 is a diagram illustrating an attachment structure (particularly the structure of the valve body 5) of the nozzle plate 3 according to modification 3 of the first embodiment. As illustrated in FIG. 7, one of the pair of engaging projections 8 and 8 of the valve body 5 is disposed in a central line 35 in parallel with the X-axis and the other of the pair of engaging projections 8 and 8 of the valve body 5 is disposed in a position deviated by θ in the circumferential direction from the X-axis. The pair of interlocking grooves 23 and 23 is formed in the nozzle plate 3 so as to correspond to the pair of engaging projections 8 and 8 according to the modification (see FIG. 2).

Since the positions of the nozzle holes 7 of the nozzle plate 3 can be uniquely determined with respect to the valve body 5 in the modification of this structure, the nozzle plate 3 can be reliably prevented from being erroneously assembled to the valve body 5.

(Modification 4 of First Embodiment)

FIG. 8 illustrates the engaging projection 8 according to a modification of the first embodiment. That is, although the engaging projection 8 according to the first embodiment is shaped like a round bar that is circular in front view, the invention is not limited to the embodiment and may be a bar that is substantially oval in front view as illustrated in FIG. 8A, a bar that is D-shaped in front view as illustrated in FIG. 8B, or a bar that is elliptic as illustrated in FIG. 8C. In addition, as illustrated in FIG. 8D, the contact portion 8a of the engaging projection 8 in contact with the arm part 20 may be an R-chamfered plate or bar (see FIG. 2B).

Second Embodiment

Figure 10A:
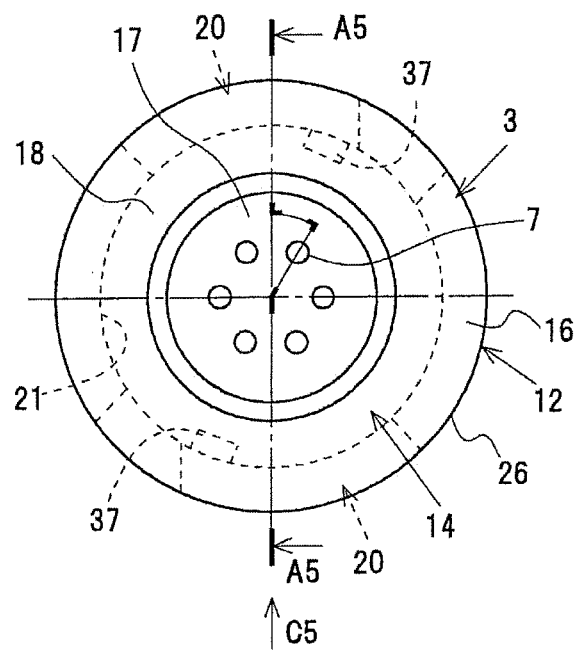
FIGS. 10A-10C illustrate the nozzle plate according to the second embodiment.
Figure 10C:
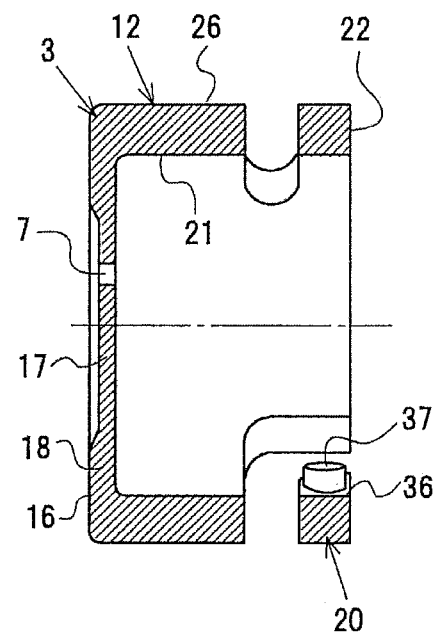
Figure 10B:
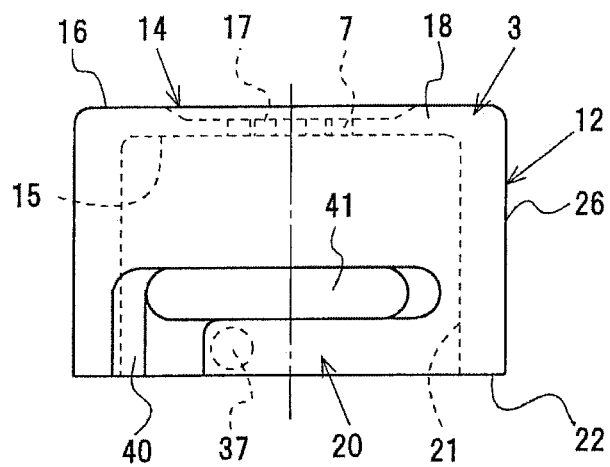
Figure 11A:
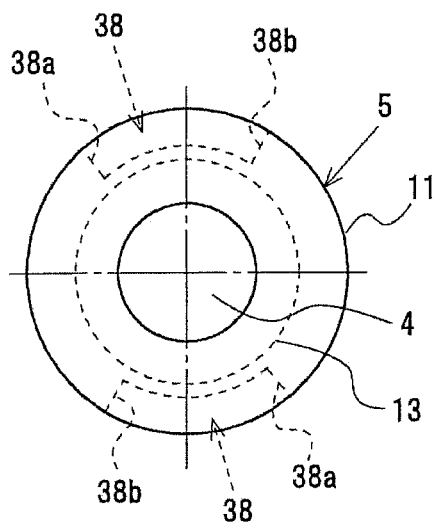
FIGS. 11A and 11B illustrate a valve body according to the second embodiment of the invention.
Figure 11B:
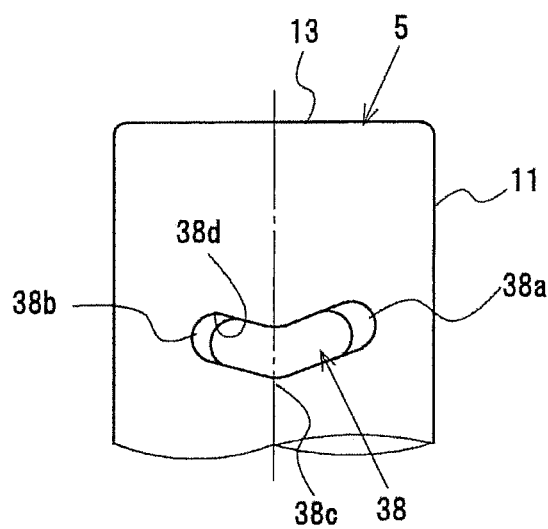

FIGS. 9 to 11 illustrate an attachment structure of the nozzle plate 3 according to a second embodiment of the invention. FIG. 9A is a front view illustrating the front end side of the fuel injection device 1, FIG. 9B is a side view illustrating the front end side of the fuel injection device 1 seen from the direction indicated by arrow C4 in FIG. 9A, FIG. 9C is a cross sectional view illustrating the front end side of the fuel injection device 1 taken along line A4-A4 in the nozzle plate 3 in FIG. 9A, and FIG. 9D is a plan view illustrating an engaging projection seen from the direction indicated by F in FIG. 9C. In addition, FIG. 10A is a front view illustrating the nozzle plate 3, FIG. 10B is a side view illustrating the nozzle plate 3 seen from the direction indicated by arrow C5 in FIG. 10A, and FIG. 10C is a cross sectional view illustrating the nozzle plate 3 taken along line A5-A5 in FIG. 10A. FIG. 11A is a front view illustrating the front end side of the valve body 5, and FIG. 11B is a side view illustrating the front end side of the valve body 5.

In the description of the attachment structure of the nozzle plate 3 according to the embodiment, components in FIGS. 9 to 11 the same as in the attachment structure of the nozzle plate 3 according to the first embodiment are given the same reference numerals and duplicate description as in the nozzle plate 3 according to the first embodiment is omitted.

As illustrated in FIGS. 9 to 11, in the embodiment, the arm part 20 of the nozzle plate 3 has the engaging projection 37 on an inner surface 36 (the surface facing the outer peripheral surface 11 of the valve body 5) on the front end side. On the other hand, the valve body 5 has the interlocking groove 38 on the outer peripheral surface 11. As illustrated in FIGS. 9C and 9D, the engaging projection 37 is provided with an engaging guide surface 37a inclined toward the opening end 22 from the central portion. The engaging guide surface 37a of the engaging projection 37 makes contact with an edge of the front end surface 13 of the valve body 5 when the nozzle plate 3 is fitted onto the valve body 5, slowly bends the arm part 20, and enables the nozzle plate 3 to be smoothly fitted onto the valve body 5.

The interlocking groove 38 is formed (cut) into a long hole extending substantially along the circumferential direction of the outer peripheral surface 11 of the valve body 5, so that one end side (one end side of the interlocking groove 38) 38a in the longitudinal direction is disposed closer to the front end surface 13 of the valve body 5 than the other end side (the other end side of the interlocking groove 38) 38b in the longitudinal direction and the middle (a middle portion 38c substantially in the middle of the interlocking groove 38 in the longitudinal direction) between the one end side 38a in the longitudinal direction and the other end side 38b in the longitudinal direction is most distant from the front end surface 13 of the valve body 5. Note that the interlocking groove 38 is formed on the outer surface 11 of the valve body 5 and does not reach the inner surface of the valve body 5.

The arm part 20 includes an axial groove 40 formed in the cylindrical fitting part 12 so as to extend in the bus line direction from the opening end 22 of the cylindrical fitting part 12 of the nozzle plate 3 and a lateral groove 41 formed in the cylindrical fitting part 12 so as to extend along the circumferential direction from the end part of the axial groove 40. The arm part 20 is formed like a cantilever that can be bent (elastically deformed) toward the opening end 22 of the cylindrical fitting part 12 and radially outward of the cylindrical fitting part 12.

In addition, in the arm part 20, the engaging projection 37 engages with the one end side 38a in the longitudinal direction of the interlocking groove 38 in the state in which the cylindrical fitting part 12 of the nozzle plate 3 is fitted onto the valve body 5 and the bottom wall part 14 of the nozzle plate 3 is in contact with the front end surface 13 of the valve body 5. In the arm part 20, in the state in which the engaging projection 37 engages with the one end side 38a in the longitudinal direction of the interlocking groove 38, when the cylindrical fitting part 12 of the nozzle plate 3 rotates relative to the valve body 5, the engaging projection 37 moves from the one end side 38a in the longitudinal direction of the interlocking groove 38 to the other end 38b in the longitudinal direction of the interlocking groove 38, the arm part 20 is bent so as to move away from the front end surface 13 of the valve body 5 and seats the engaging projection 37 on the other end side 38b (as the lock position) in the longitudinal direction of the interlocking groove 38. At this time, the arm part 20 pushes the engaging projection 37 against a groove wall 38d on the other end side 38b in the longitudinal direction of the interlocking groove 38 using the elastic force generated by being bent and fixes the engaging projection 37 to the other end side 38b in the longitudinal direction of the interlocking groove 38. Moreover, the middle portion 38c substantially in the middle in the longitudinal direction of the interlocking groove 38 is disposed in a position most distant from the front end surface 13 of the valve body 5. Accordingly, it is not easy for the engaging projection 37 fixed to the other end side 38b of the interlocking groove 38 by the elastic force of the arm part 20 to climb over the middle portion 38c in the longitudinal direction of the interlocking groove 38 and move to the one end side 38a in the longitudinal direction of the interlocking groove 38. This fixes the nozzle plate 3 to the valve body 5 while being retained. The interlocking groove 38 of the valve body 5 and the engaging projection 37 of the arm part 20 engaging with the interlocking groove 38 form the interlocking means for fixing the cylindrical fitting part 12 to the valve body 5 while being retained.

In the attachment structure of the nozzle plate 3 according to the embodiment, only by rotating the cylindrical fitting part 12 relative to the valve body 5 and moving the engaging projection 37 of the arm part 20 from the one end side 38a in the longitudinal direction of the interlocking groove 38 to the other end side 38b after engaging the engaging projection 37 of the arm part 20 with the one end side 38a in the longitudinal direction of the interlocking groove 38, the engaging projection 37 of the arm part 20 is pushed against the other end side 38b (the lock position in the interlocking groove 38) in the longitudinal direction of the interlocking groove 38 of the valve body 5 by the elastic force of the arm part 20 and the engaging projection 37 is seated and fixed on the groove wall 38d on the other end side 38b of the interlocking groove 38. That is, in the attachment structure of the nozzle plate 3 according to the embodiment, the nozzle plate 3 is fixed to the valve body 5 in the state in which the engaging projection 37 of the arm part 20 is fixed to the other end side 38b (the lock position in the interlocking groove 38) in the longitudinal direction of the interlocking groove 38 of the valve body 5 while being retained by the elastic force of the arm part 20. Accordingly, in the attachment structure of the nozzle plate 3 according to the embodiment, the manufacturing man-hours and manufacturing cost of the fuel injection device 1 can be reduced as compared with the conventional example (see FIG. 18) in which the nozzle plate 103 of metal is fixed to the front end of the valve body 102 of metal by welding.

In addition, in the attachment structure of the nozzle plate 3 according to the embodiment, when a difference in thermal expansion is generated between the nozzle plate 3 of synthetic resin and the valve body 5 of metal or manufacturing error is present in the nozzle plate 3 and the valve body 5, the arm part 20 is elastically deformed to absorb the difference in thermal expansion between the nozzle plate 3 and the valve body 5 and the manufacturing error of the nozzle plate 3 and the valve body 5, the engaging projection 37 of the arm part 20 is continuously fixed to the other end side 38b in the longitudinal direction of the interlocking groove 38 by the elastic force of the arm part 20, the elastic force (the force caused by the elastic deformation of the arm part 20) pushing the bottom wall part 14 of the nozzle plate 3 against the front end surface 13 of the valve body 5 is constantly applied, and no space is generated between the bottom wall part 14 of the nozzle plate 3 and the front end surface 13 of the valve body 5. Accordingly, even when the injection pressure of fuel acts on the nozzle plate 3, the nozzle plate 3 is not removed from the valve body 5 and the nozzle plate 3 achieves a desired function (function of atomizing fuel).

In addition, in the attachment structure of the nozzle plate 3 according to the embodiment, since the engaging projection 37 of the arm part 20 is fixed to the other end side 38b (the lock position in the interlocking groove 38) in the longitudinal direction of the interlocking groove 38 of the valve body 5 by the elastic force of the arm part 20, the nozzle plate 3 is fixed to the valve body 5 while being retained. Accordingly, in the attachment structure of the nozzle plate 3 according to the embodiment, a failure (the nozzle hole 104 is blocked by welding spatter) does not occur unlike the conventional example (see FIG. 18) in which the nozzle plate 103 of metal is fixed to the front end of the valve body 102 of metal by welding and all nozzle holes 7 surely achieve the function of atomizing fuel.

In the embodiment, since the width across flat parts 33 are formed by partially cutting the one end side (close to the bottom wall part 14) of the cylindrical fitting part 12 as in modification 2 of the first embodiment, effects similar to those in modification 2 of the first embodiment can be obtained (see FIG. 6).

(Modification 1 of the Second Embodiment)

Figure 12A:
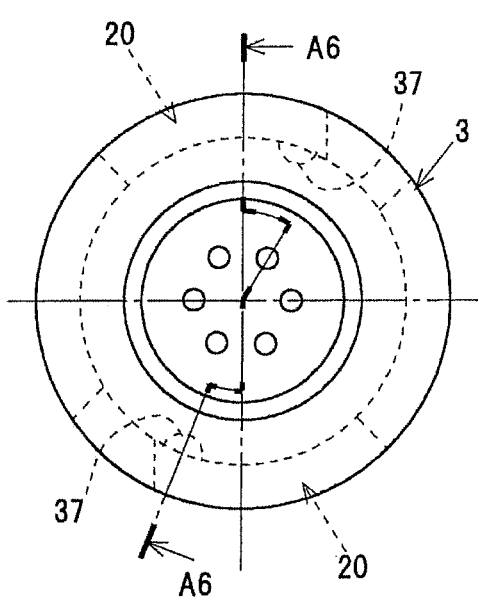
FIGS. 12A and 12B illustrate modification 1 of the second embodiment.
Figure 12B:
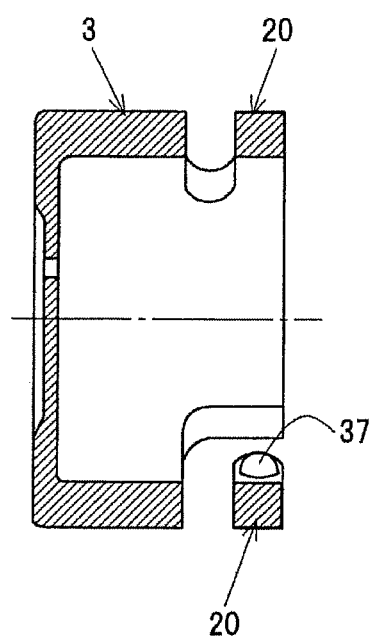

FIG. 12 is a diagram of modification 1 of the second embodiment illustrating a modification of the noise plate 3. FIG. 12A is a front view illustrating the nozzle plate 3 and FIG. 12B is a cross sectional view illustrating the nozzle plate 3 taken along line A6-A6 in FIG. 12A.

As illustrated in FIG. 12, in the nozzle plate 3 according to the modification, the engaging projection 37 of the arm part 20 has a shape different from that of the engaging projection 37 of the arm part 20 according to the second embodiment, but the other components are the same as in the nozzle plate 3 according to the second embodiment. That is, the engaging projection 37 of the arm part 20 is hemispherical in the modification. On the other hand, the engaging projection 37 of the arm part 20 according to the second embodiment is round-bar-shaped. In the nozzle plate 3 according to the embodiment, the arm part 20 and the engaging projection 37 easily engage with the outer peripheral surface 11 of the valve body 5 and the engaging projection 37 easily engages with the interlocking groove 38 of the valve body 5 (see FIG. 9).

(Modification 2 of Second Embodiment)

Figure 13:
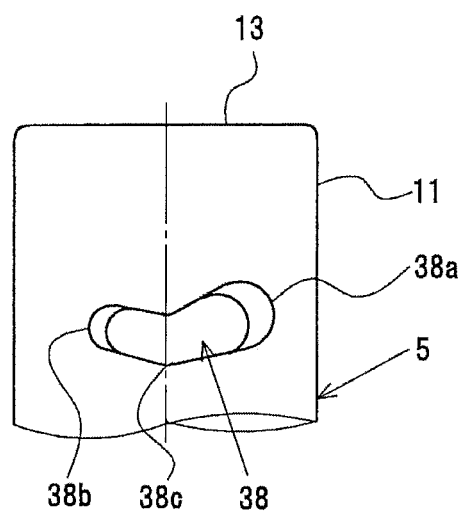
FIG. 13 is a diagram of modification 2 of the second embodiment illustrating a side view of the front end side of a valve body.

FIG. 13 is a diagram of modification 2 of the second embodiment illustrating (as a side view of the front end side of the valve body 5) an aspect in which the groove width of the one end side 38a in the longitudinal direction of the interlocking groove 38 is larger than the groove width of the other end side 38b in the longitudinal direction of the interlocking groove 38 so that the engaging projection 37 of the arm part 20 easily engages with the one end side 38a of the interlocking groove 38 (see FIG. 9).

(Modification 3 of Second Embodiment)

Figure 14A:
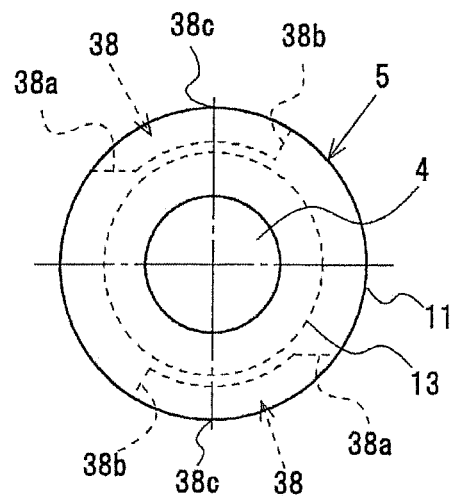
FIGS. 14A and 14B illustrate modification 3 of the second embodiment.
Figure 14B:
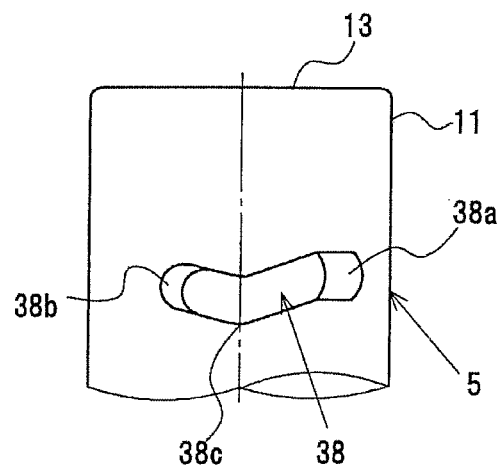

FIG. 14 is a diagram of modification 3 of the second embodiment illustrating an aspect in which the groove depth of the one end side 38a in the longitudinal direction of the interlocking groove 38 is gradually changed so that the engaging projection 37 of the arm part 20 smoothly engages with the interlocking groove 38 (see FIG. 9). FIG. 14A is a front view illustrating the front end side of the valve body 5 and FIG. 14B is a side view illustrating the front end side of the valve body 5.

(Modification 4 of Second Embodiment)

Figure 15:
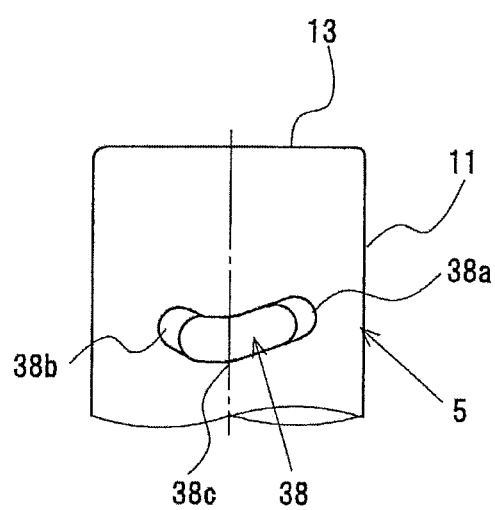
FIG. 15 is a diagram of modification 4 of the second embodiment illustrating a side view of a valve body.

FIG. 15 is a diagram of modification 4 of the second embodiment illustrating (as a side view of the front end side of the valve body 5) an aspect in which two inclination angles of the interlocking groove 38 are present between the middle portion 38c in the longitudinal direction of the interlocking groove 38 and the other end side 38b in the longitudinal direction of the interlocking groove 38. That is, in the range from the middle portion 38c in the longitudinal direction to the other end side 38b in the longitudinal direction of the interlocking groove 38 in the modification, the inclination angle of the interlocking groove 38 close to the other end side 38b in the longitudinal direction is larger than the inclination angle of the interlocking groove 38 close to the middle portion 38c in the longitudinal direction, so that the operator can feel the accommodation of the engaging projection 37 in the lock position (the other end side 38b) of the interlocking groove 38 and the engaging projection 37 cannot be easily removed from the other end side 38b in the longitudinal direction of the interlocking groove 38.

(Modification 5 of Second Embodiment)

Figure 16:
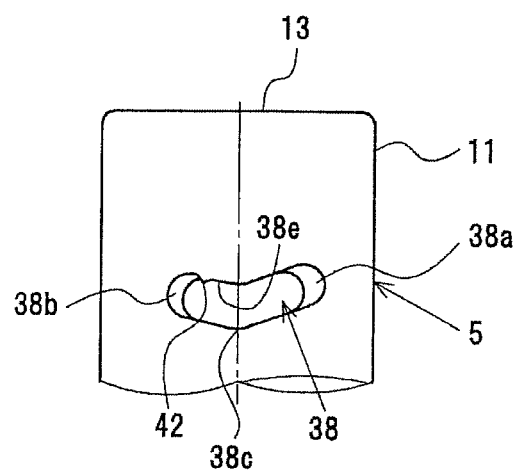
FIG. 16 is a diagram of modification 5 of the second embodiment illustrating a side view of a valve body.

FIG. 16 is a diagram of modification 5 of the second embodiment illustrating (as a side view of the front end side of the valve body 5) an aspect in which the removal preventing projection 42 is provided in a position close to the other end side 38b in the longitudinal direction of the interlocking groove 38. That is, the interlocking groove 38 in the modification is provided with the removal preventing projection 42 in a position close to the other end side 38b in the longitudinal direction on a groove wall 38e with which the engaging projection 37 makes contact. Accordingly, when the engaging projection 37 climbs over the removal preventing projection 42 and then is accommodated in the other end side 38b in the longitudinal direction of the interlocking groove 38, the operator's hand receives the impact caused when the engaging projection 37 climbs over the removal preventing projection 42, the operator can feel the accommodation of the engaging projection 37 in the lock position (the other end side 38b) of the interlocking groove 38, and the engaging projection 37 cannot be easily removed from the other end side 38b in the longitudinal direction of the interlocking groove 38.

(Modification 6 of Second Embodiment)

Figure 17A:
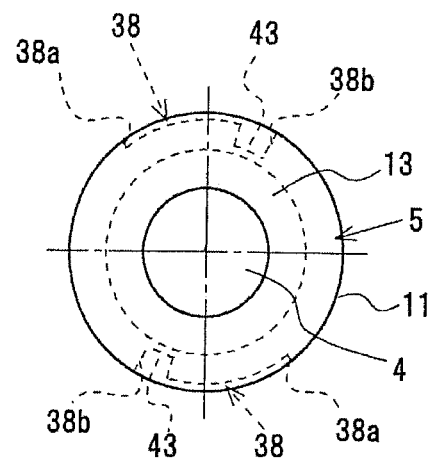
FIGS. 17A and 17B illustrate modification 6 of the second embodiment.
Figure 17B:
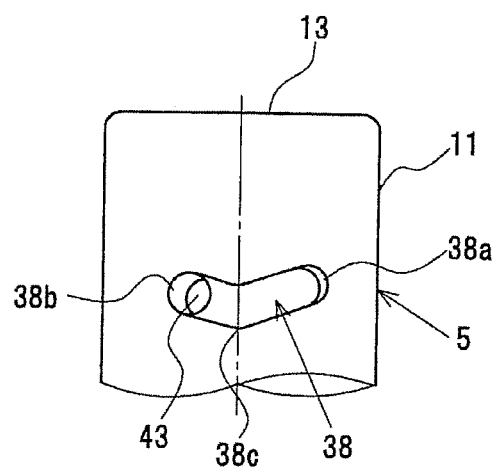

FIG. 17 is a diagram of modification 6 of the second embodiment illustrating an aspect in which a projection engaging hole (positioning recessed portion) 43 accommodating the engaging projection 37 of the arm part 20 is formed on the other end side 38b in the longitudinal direction of the interlocking groove 38 (see FIG. 9). That is, the interlocking groove 38 in the modification has the same groove depth except the projection engaging hole 43 and the groove depth is smaller than the depth of the projection engaging hole 43. In the modification as described above, the operator can feel the accommodation of the engaging projection 37 in the lock position (the projection engaging hole 43 on the other end side 38b) in the interlocking groove 38, the engaging projection 37 cannot be easily removed from the other end side 38b (the projection engaging hole 43) in the longitudinal direction of the interlocking groove 38, and the engaging projection 37 is positioned and surely fixed on the other end side in the longitudinal direction of the interlocking groove 38 (see FIG. 9). FIG. 17A is a plan view illustrating the front end side of the valve body 5 and FIG. 17B is a side view illustrating the front end side of the valve body 5.

Third Embodiment (Fuel Injection Device)

Figure 18:
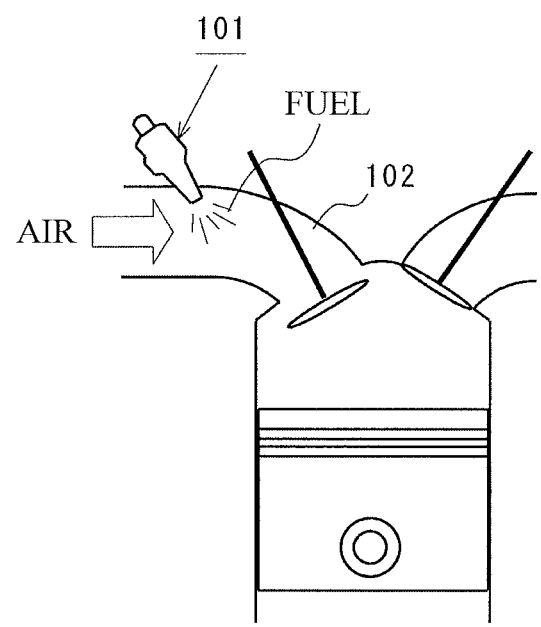
FIG. 18 schematically illustrates the use state of another fuel injection device.
Figure 19A:
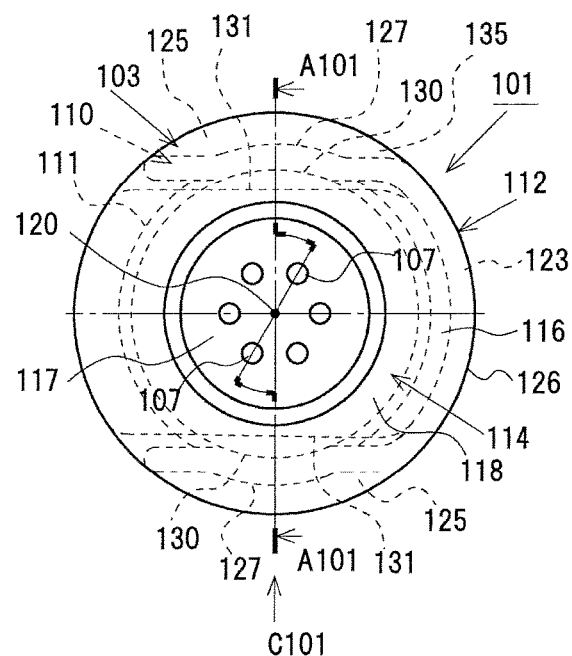
FIGS. 19A-19D illustrate an attachment structure of a nozzle plate according to a third embodiment of the invention.
Figure 19C:
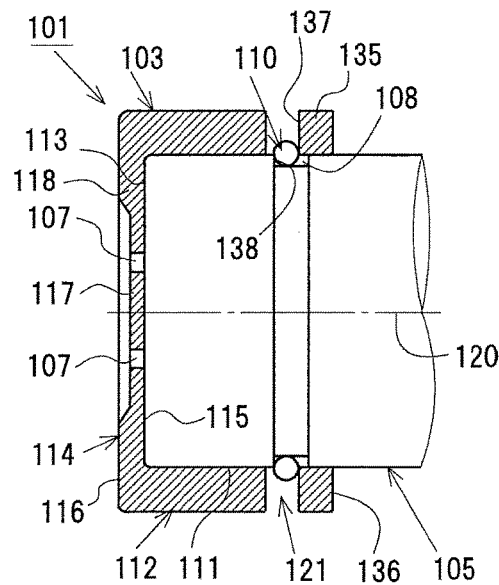
Figure 19B:
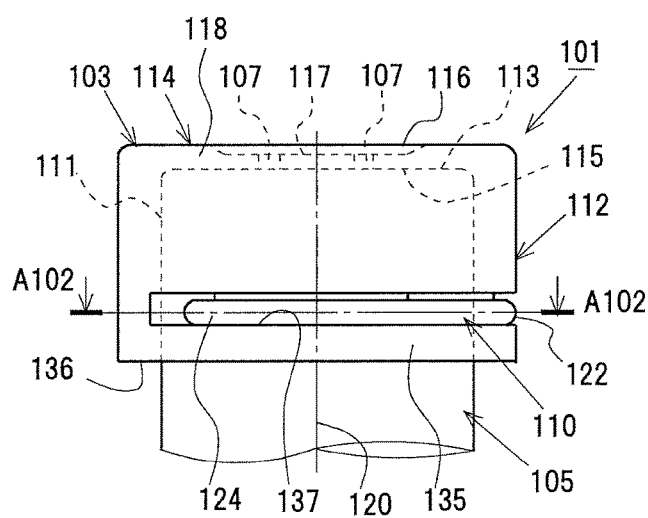
Figure 19D:
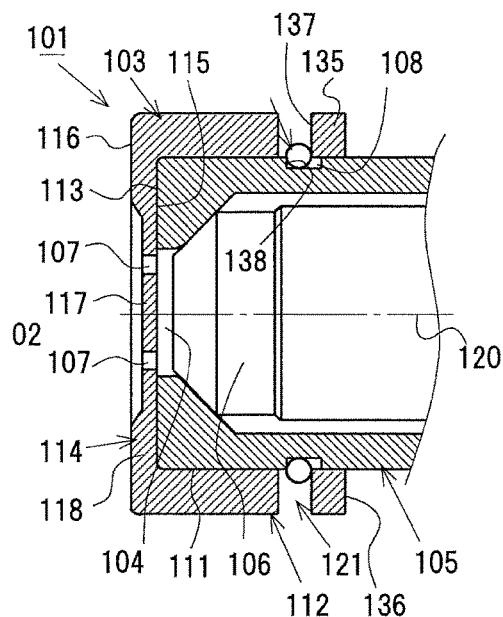

FIG. 18 schematically illustrates the use state of a fuel injection device 101 (see FIG. 19). As illustrated in FIG. 18, the fuel injection device 101 of port injection type is installed at an intermediate point on an intake air pipe 102 of the engine, injects fuel into the intake air pipe 102, mixes air introduced to the intake air pipe 102 and the fuel, and generates a combustible gas mixture.

FIG. 19 illustrates the front end side of the fuel injection device 101 to which the fuel injection device nozzle plate 103 (abbreviated below as the nozzle plate) has been attached. FIG. 19A is a front view illustrating the front end side of the fuel injection device 101. FIG. 19B is a side view illustrating the front end side of the fuel injection device 101 seen from the direction indicated by arrow C101 in FIG. 19A. FIG. 19C is a cross sectional view illustrating the front end side of the fuel injection device 101 taken along line A101-A101 in the nozzle plate 103 in FIG. 19A. FIG. 19D is a cross sectional view illustrating the front end side of the fuel injection device 101 taken along line A101-A101 in the entire fuel injection device 101 in FIG. 19A.

As illustrated in FIG. 19, in the fuel injection device 101, the nozzle plate 103 of synthetic resin is attached to the front end side of the valve body 105 of metal in which the fuel injection port 104 is formed. The fuel injection device 101 has the needle valve 106 opened or closed by a solenoid (not illustrated) and, when the needle valve 106 is opened, fuel in the valve body 105 is injected from the fuel injection port 104 and the fuel injected from the fuel injection port 104 is injected externally via nozzle holes 107 of the nozzle plate 103. The valve body 105 is circular in front view (see FIG. 22A) and the annular interlocking groove 108 is formed in the circumferential direction around the outer peripheral surface on the front end side (see FIGS. 22A and 22B). The interlocking groove 108 has a rectangular cross section (cross section along the bus line of the valve body 105) and a part of the U-ring 110 engages with the interlocking groove 108 (see FIGS. 19 and 20). The nozzle plate 103 is injection-molded using synthetic resin such as PPS, PEEK, POM, PA, PES, PEI, or LCP.

(Attachment Structure of Nozzle Plate)

Figure 20:
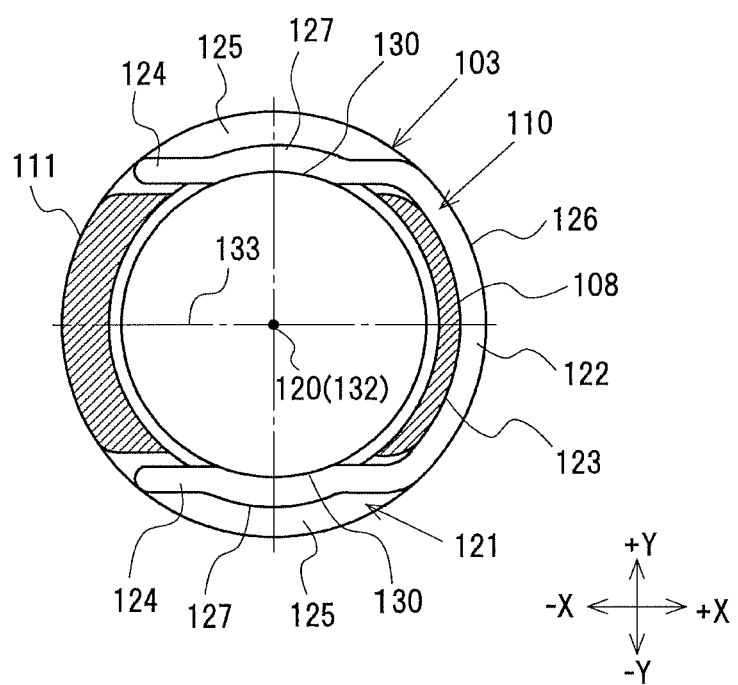
FIG. 20 is a cross sectional view illustrating the fuel injection device taken along line A102-A102 in FIG. 19B.
Figure 21A:
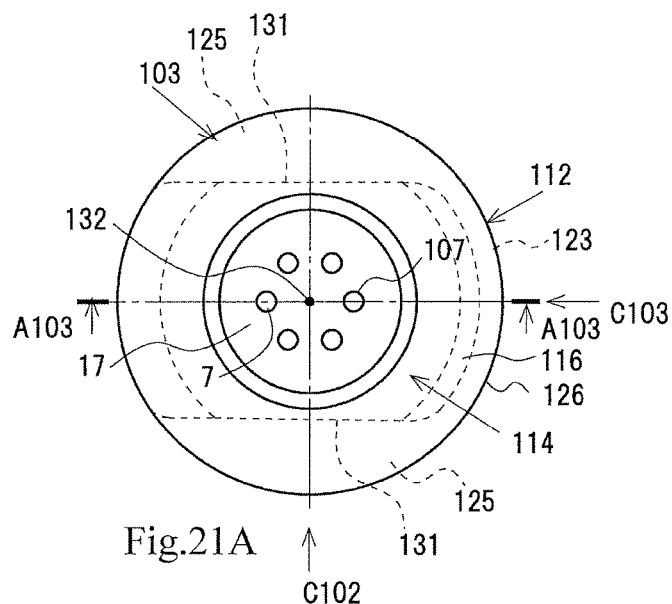
FIGS. 21A-21E illustrate the nozzle plate according to the third embodiment of the invention.
Figure 21C:
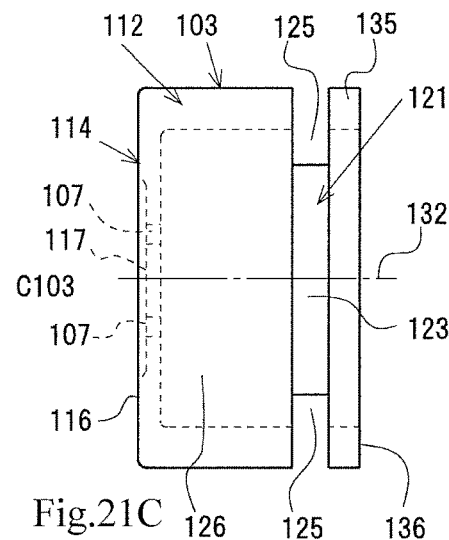
Figure 21B:
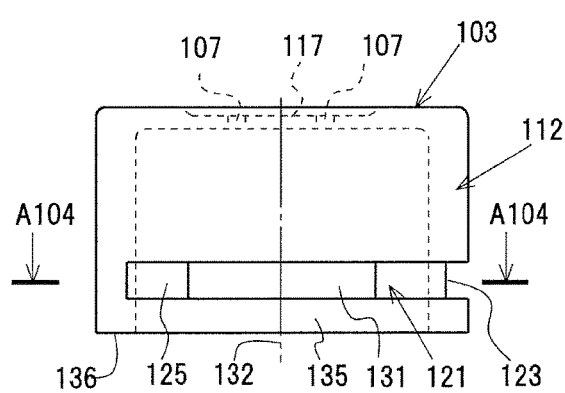
Figure 21E:
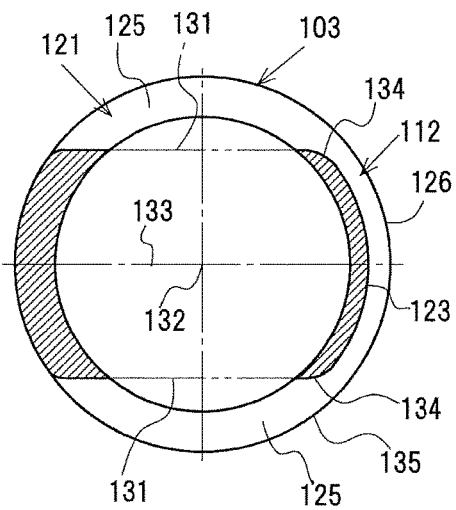
Figure 21D:
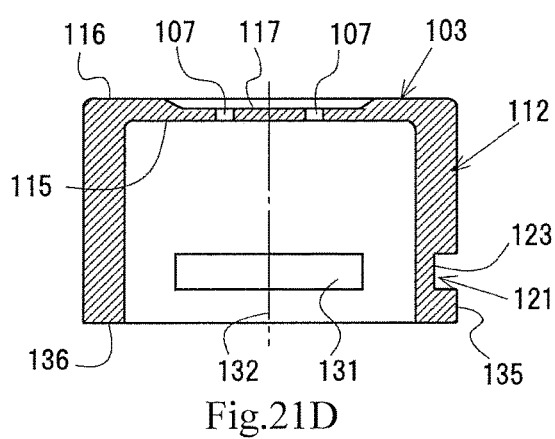
Figure 22A:
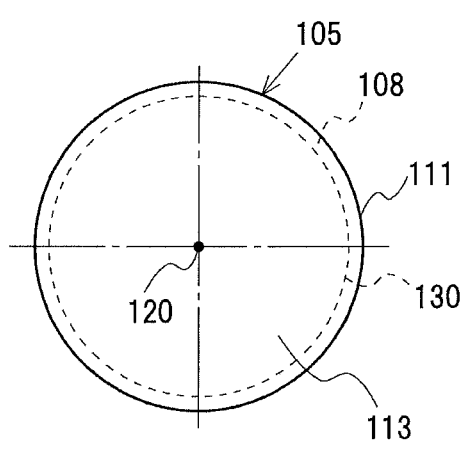
FIGS. 22A and 22B illustrate a valve body according to the third embodiment of the invention.
Figure 22B:
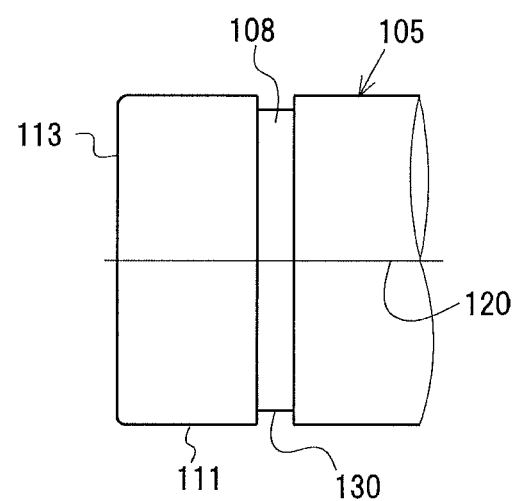
Figure 23A:
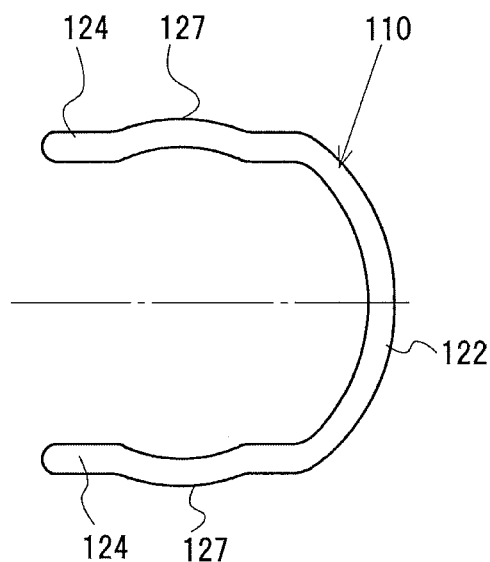
FIGS. 23A and 23B illustrate a U-ring according to the third embodiment of the invention.
Figure 23B:
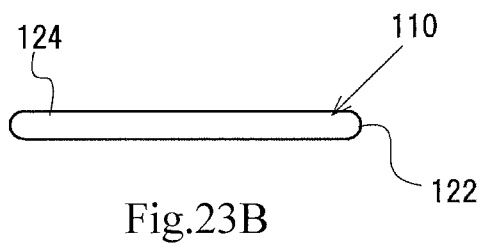

An attachment structure of the nozzle plate 103 according to the embodiment will be described below with reference to FIGS. 19 to 23. FIG. 20 is a cross sectional view illustrating the fuel injection device 101 taken along line A102-A102 in FIG. 19B. FIG. 21A is a front view illustrating the nozzle plate 103, FIG. 21B is a side view illustrating the nozzle plate 103 seen from the direction indicated by C102 in FIG. 21A, FIG. 21C is a side view illustrating the nozzle plate 103 seen from the direction indicated by C103 in FIG. 21A, FIG. 21D is a cross sectional view of the nozzle plate 103 taken along line A103-A103 in FIG. 21A, and FIG. 21E is a cross sectional view of the nozzle plate 103 taken along line A104-A104 in FIG. 21B. In addition, FIG. 22A is a front view illustrating the front end side of the valve body 105 and FIG. 22B is a side view illustrating the front end side of the valve body 105. In addition, FIG. 23A is a plan view illustrating the U-ring 10 and FIG. 23B is a side view illustrating the U-ring 10.

As illustrated in FIGS. 19 to 22, the nozzle plate 103 is a bottomed cylindrical body integrally having a cylindrical fitting part 112 to be pressure-fitted onto a front end side outer peripheral surface 111 of the valve body 105 and a bottom wall part 114 formed so as to block one end side of the cylindrical fitting part 112, the bottom wall part 114 abutting against a front end surface 113 of the valve body 105.

The bottom wall part 114 has the plurality of nozzle holes 107 (six nozzle holes at regular intervals in the circumferential direction) for injecting fuel injected from the fuel injection port 104 of the fuel injection device 101 externally (into the intake air pipe 102). An inner surface 115 (surface in close contact with the front end surface 113 of the valve body 105) of the bottom wall part 114 is a flat surface and an outer surface 116 is recessed in a central part 117. That is, the central part 117 of the bottom wall part 114 in which nozzle holes 107 are formed is a discoid thin-walled part and an outer periphery part 118, surrounding the central part 117, that connects to one end side of the cylindrical fitting part 112 is a thick-walled part, which is thicker than the central part 117. Although a total of the six nozzle holes 107 are formed in the bottom wall part 114, the invention is not limited to the embodiment and the number of holes and the diameter of holes may be determined as appropriate according to necessary fuel injection characteristics.

The cylindrical fitting part 112 is cylindrical and has an inner diameter slightly smaller than the outer diameter of the valve body 105 so as to be interference-fitted onto the front end side of the valve body 105. The cylindrical fitting part 112 has one end side blocked by the bottom wall part 114 and the other end side opened so as to receive the front end side of the valve body 105. In the valve body 105 onto which the cylindrical fitting part 112 is to be press-fitted, the interlocking groove 108 is formed around the outer peripheral surface 111 of the front end side. The cross section of the interlocking groove 108 of the valve body 105 is shaped like a rectangular recess taken along a central axis 120 of the valve body 105 (see FIGS. 19C and 19D and FIG. 22).

The cylindrical fitting part 112 is provided with a ring attachment groove 121 to which the U-ring 110 is attached. The ring attachment groove 121 includes an arc part engaging groove portion 123 with which an arc part 122 of the U-ring 110 engages and the pair of arm part engaging groove portions 125 and 125 with which a part of arm parts 124 and 124 extending substantially in parallel from both ends of the arc part 122 of the U-ring 110 engages (see FIG. 23). The groove depth of the arc part engaging groove portion 123 is almost the same as the wire diameter of the U-ring 110 and the arc part engaging groove portion 123 extends like an arc to the pair of arm part engaging groove portions 125 and 125 along an outer peripheral surface 126 of the cylindrical fitting part 112. The pair of arm part engaging groove portions 125 and 125 projects to the extent to which a valve body pushing portion 127 of the U-ring 110 makes contact with a groove bottom 130 of the interlocking groove 108 of the valve body 105 when the cylindrical fitting part 112 is fitted onto the valve body 105. As a result, the groove bottom of the arm part engaging groove portion 125 is provided with a window 131 enabling exposure of the valve body 105. As illustrated in FIGS. 20 and 21A, when the virtual plane orthogonal to a central axis 132 of the cylindrical fitting part 112 (the nozzle plate 103) is assumed to be the X-Y coordinate plane, the pair of arm part engaging groove portions 125 and 125 is formed substantially in parallel with the X-axis and is formed symmetrically with respect to a center line 133 orthogonal to the central axis 132 of the cylindrical fitting part 112. A connection portion 134 between the arc part engaging groove portion 123 and the arm part engaging groove portion 125 is formed as a smoothly curved surface, functions as a guide surface for inserting the front ends of the arm parts 124 of the U-ring 110 into the arm part engaging groove portions 125, and smoothly guides the front ends of the arm parts 124 of the U-ring 110 to the inside of the arm part engaging groove portions 125.

The ring attachment groove 121 of the cylindrical fitting part 112 is formed to have a groove width larger than the wire diameter of the U-ring 110. In addition, the ring attachment groove 121 of the cylindrical fitting part 112 is positioned slightly closer to the bottom wall part 114 than the interlocking groove 108 of the valve body 105 in the state in which the nozzle plate 103 is press-fitted onto the front end side of the valve body 105 and the bottom wall part 114 of the nozzle plate 103 makes contact with the front end surface 113 of the valve body 105. In addition, since the cylindrical fitting part 112 is provided with the ring attachment groove 121, the thin-walled U-ring supporting portion (elastically deformable portion) 135 having substantially a C-ring shape in plan view is formed in the part of the cylindrical fitting part 112 close to an opening end 136. When the U-ring 110 is attached to the ring attachment groove 121 of the cylindrical fitting part 112 in the state in which the nozzle plate 103 is press-fitted onto the front end side of the valve body 105 and the bottom wall part 114 of the nozzle plate 103 makes contact with the front end surface 113 of the valve body 105, the U-ring 110 is interposed between a groove wall 137 of the arm part engaging groove portion 125 and a groove wall 138 of the interlocking groove 108 while elastically deforming the U-ring supporting portion 135 and the U-ring 110 is pushed against the groove wall 138 of the interlocking groove 108 by the elastic force of the U-ring supporting portion 135.

The U-ring 110 is formed by bending an elastically deformable metal wire having a circular cross section. The U-ring 110 integrally has the arc part 122 and the pair of arm parts 124 and 124 extending substantially in parallel from both ends of the arc part 122. In addition, the arm part 124 of the U-ring 110 has the valve body pushing portion 127 formed like an arc along the shape of the groove bottom of the interlocking groove 108 of the valve body 105. The U-ring 110 as described above is attached to the ring attachment groove 121 of the cylindrical fitting part 112 and the interlocking groove 108 of the valve body 105 while being elastically deformed to extend the spacing between the pair of arm parts 124 and 124, elastically clamps the valve body 105 between both sides in the radial direction using the valve body pushing portions 127 and 127 of the pair of arm parts 124 and 124, and is clamped between the groove wall 137 of the ring attachment groove 121 of the cylindrical fitting part 112 and the groove wall 138 of the interlocking groove 108 of the valve body 105. This surely fixes the nozzle plate 103 to the front end side of the valve body 105. The interlocking groove 108 of the valve body 105 and the U-ring 110 engaging with the interlocking groove 108 form the interlocking means for fixing the cylindrical fitting part 112 to the valve body 105 while being retained.

(Effect of Third Embodiment)

Figure 30:
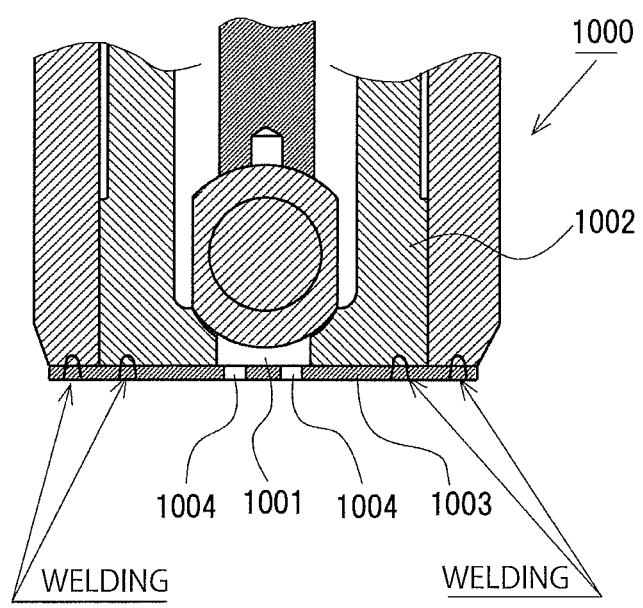
FIG. 30 is a cross sectional view of the front end side of a fuel injection device illustrating a conventional attachment structure of a nozzle plate.

In the attachment structure of the nozzle plate 103 according to the embodiment, when the cylindrical fitting part 112 of the nozzle plate 103 is press-fitted onto the front end side of the valve body 105 and the U-ring 110 is attached to the ring attachment groove 121 of the nozzle plate 103, the U-ring 110 is superposed between the groove wall 137 of the arm part engaging groove portion 125 and the groove wall 138 of the interlocking groove 108 while elastically deforming the U-ring supporting portion 135 and the U-ring 110 is pushed against the groove wall 138 of the interlocking groove 108 by the elastic force of the U-ring supporting portion 135. As a result, in the attachment structure of the nozzle plate 103 according to the embodiment, since the U-ring 110 is elastically clamped between the groove wall 138 of the interlocking groove 108 of the valve body 105 and the groove wall 137 of the ring attachment groove 121 of the nozzle plate 103 and the nozzle plate 103 is surely fixed to the valve body 105 while being retained by the U-ring 110, the manufacturing man-hours and manufacturing cost of the fuel injection device 101 can be reduced as compared with the conventional example (see FIG. 30) in which the nozzle plate 1003 of metal is fixed to the front end of the valve body 1002 of metal by welding.

In addition, in the attachment structure of the nozzle plate 103 according to the embodiment, when a difference in thermal expansion is generated between the nozzle plate 103 of synthetic resin and the valve body 105 of metal after the nozzle plate 103 is press-fitted onto the valve body 105, the U-ring supporting portion 135 is elastically deformed to absorb the difference in thermal expansion between the nozzle plate 103 and the valve body 105, the U-ring 110 is continuously clamped between the groove wall 138 of the interlocking groove 108 and the groove wall 137 of the ring attachment groove 121, and no space is generated between the bottom wall part 114 of the nozzle plate 103 and the front end surface 113 of the valve body 105. Accordingly, even when the injection pressure of fuel acts on the nozzle plate 103, the nozzle plate 103 is not removed from the valve body 105 and the nozzle plate 103 achieves a desired function (function of atomizing fuel). Since the nozzle plate 103 of synthetic resin has a thermal expansion rate larger than in the valve body 105 of metal, the thermal expansion of the nozzle plate 103 is larger than in the valve body 105 of metal.

In addition, in the attachment structure of the nozzle plate 103 according to the embodiment, when the valve body 105 and the nozzle plate 103 have manufacturing error, the U-ring supporting portion 135 is elastically deformed to absorb the manufacturing error of the nozzle plate 103 and the valve body 105, the U-ring 110 is continuously clamped between the groove wall 138 of the interlocking groove 108 and the groove wall 137 of the ring attachment groove 121, and no space is generated between the bottom wall part 114 of the nozzle plate 103 and the front end surface 113 of the valve body 105. Accordingly, even when the injection pressure of fuel acts on the nozzle plate 103, the nozzle plate 103 is not removed from the valve body 105 and the nozzle plate 103 achieves a desired function (function of atomizing fuel).

In the attachment structure of the nozzle plate 103 according to the embodiment, since the cylindrical fitting part 112 of the nozzle plate 103 is press-fitted onto the front end side of the valve body 105 and the nozzle plate 103 can be fixed to the valve body 105 while being retained by the U-ring 110, a failure (a nozzle hole 1004 is blocked by welding spatter) does not occur unlike the conventional example (see FIG. 30) in which the nozzle plate 1003 of metal is fixed to the front end of the valve body 1002 of metal by welding and all nozzle holes 107 surely achieve the function of atomizing fuel.

In the attachment structure of the nozzle plate 103 according to the embodiment, the front shape of the nozzle plate 103 and the valve body 105 is not limited to a circle and may be a polygon such as a hexagon, D-shape, oval, or the like.

Fourth Embodiment

Figure 24A:
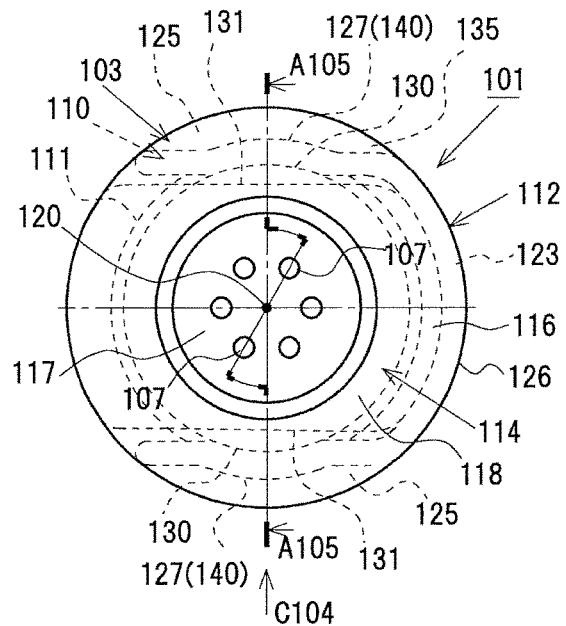
FIGS. 24A-24C illustrate an attachment structure of a nozzle plate according to a fourth embodiment of the invention.
Figure 24C:
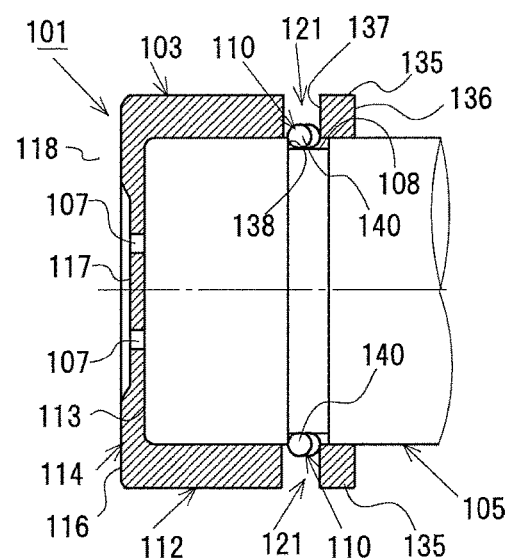
Figure 24B:
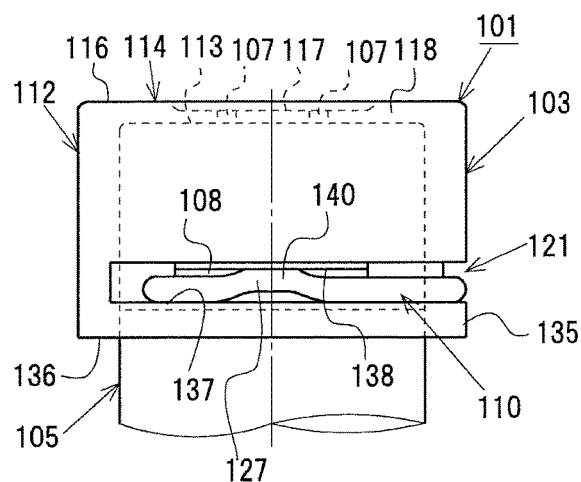
Figure 25A:
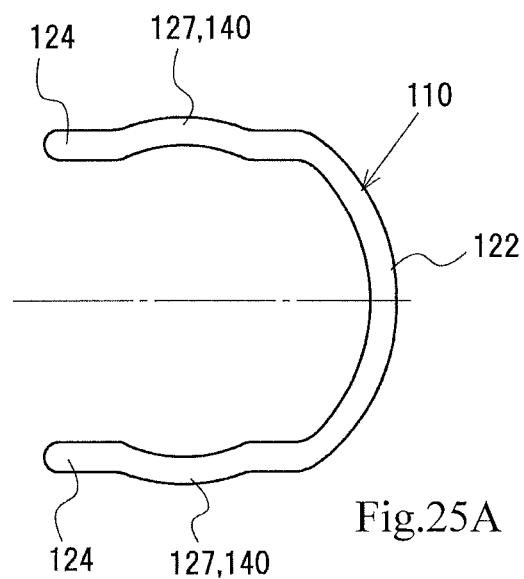
FIGS. 25A and 25B illustrate a U-ring according to the fourth embodiment of the invention.
Figure 25B:
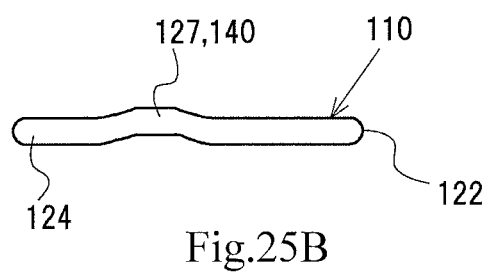

FIGS. 24 and 25 illustrate an attachment structure of the nozzle plate 103 according to a fourth embodiment of the invention. In the description of the attachment structure of the nozzle plate 103 according to the embodiment, components in FIGS. 24 and 25 the same as in the attachment structure of the nozzle plate 103 according to the third embodiment are given the same reference numerals and duplicate description as in the nozzle plate 103 according to the third embodiment is omitted.

As illustrated in FIGS. 24 and 25, in the attachment structure of the nozzle plate 103 according to the embodiment, the groove width of the ring attachment groove 121 and the groove width of the interlocking groove 108 are wider than the groove width of the ring attachment groove 121 and the groove width of the interlocking groove 108 according to the third embodiment, respectively. In addition, the arm part 124 of the U-ring 110 is provided with a spring action portion 140 bent so as to project in the groove width direction of the interlocking groove 108. The U-ring 110 has the same shape in plan view as the U-ring 110 according to the third embodiment (see FIGS. 23A and 25A). However, in the U-ring 110 according to the embodiment, the spring action portion 140 is formed in the part of the valve body pushing portion 127 that engages with the interlocking groove 108 and the spring action portion 140 elastically makes contact with the groove wall 138 of the interlocking groove 108 while being elastically deformed and the other part except the spring action portion 140 makes contact with the groove wall 137 (the groove wall 137 of the ring attachment groove 121 facing the groove wall 138 of the interlocking groove 108 in contact with the spring action portion 140) of the ring attachment groove 121. At this time, the U-ring supporting portion 135 is pushed by the U-ring 110 and elastically deformed.

In the attachment structure of the nozzle plate 103 according to the embodiment, the elastic force of the U-ring 110 is applied in a direction in which the groove wall 138 of the interlocking groove 108 moves away from the groove wall 137 of the ring attachment groove 121, and the force pushing the bottom wall part 114 of the nozzle plate 103 against the front end surface 113 of the valve body 105 is constantly applied.

Accordingly, in the attachment structure of the nozzle plate 103 according to the embodiment, when a difference in thermal expansion is generated between the valve body 105 of metal and the nozzle plate 103 of synthetic resin or manufacturing error is present in the nozzle plate 103 and the valve body 105, the spring action portion 140 of the U-ring 110 is elastically deformed (elastically restored or further bent), the U-ring supporting portion 135 is elastically deformed to absorb the difference in thermal expansion between the valve body 105 and the nozzle plate 103 and the manufacturing error of the valve body 105 and the nozzle plate 103, and the U-ring 110 elastically makes contact with the groove wall 138 of the interlocking groove 108 and the groove wall 137 of the ring attachment groove 121 so as to press them. Accordingly, it is possible to counteract the force removing the nozzle plate 103 from the valve body 105 using the friction force applied between the cylindrical fitting part 112 and the valve body 105, the elastic force of the U-ring 110, and the elastic force of the U-ring supporting portion 135. As a result, even when a difference in thermal expansion is generated between the valve body 105 of metal and the nozzle plate 103 of synthetic resin or manufacturing error is present in the valve body 105 and the nozzle plate 103, no space is generated between the bottom wall part 114 of the nozzle plate 103 and the front end surface 113 of the valve body 105 and, even if the injection pressure of fuel acts on the nozzle plate 103, the nozzle plate 103 is not removed from the valve body 105.

In the attachment structure of the nozzle plate 103 according to the embodiment, effects similar to those in the attachment structure of the nozzle plate 103 according to the third embodiment can be obtained. That is, in the attachment structure of the nozzle plate 103 according to the embodiment, only by press-fitting the cylindrical fitting part 112 of the nozzle plate 103 onto the front end side of the valve body 105 and attaching the U-ring 110 to the ring attachment groove 121 of the nozzle plate 103, the nozzle plate 103 is fixed to the front end side of the valve body 105 while being retained. Accordingly, the manufacturing man-hours and manufacturing cost of the fuel injection device 101 can be reduced as compared with the conventional example (see FIG. 30) in which the nozzle plate 1003 of metal is fixed to the front end of the valve body 1002 of metal by welding.

In addition, in the attachment structure of the nozzle plate 103 according to the embodiment, since the nozzle plate 103 is fixed to the front end side of the valve body 105 while being retained only by press-fitting the cylindrical fitting part 112 of the nozzle plate 103 onto the front end side of the valve body 105 and attaching the U-ring 110 to the ring attachment groove 121 of the nozzle plate 103, a failure (the nozzle hole 1004 is blocked by welding spatter) does not occur unlike the conventional example (see FIG. 30) in which the nozzle plate 1003 of metal is fixed to the front end of the valve body 1002 of metal by welding and all nozzle holes 107 surely achieve the function of atomizing fuel.

Although the embodiment illustrates an aspect in which the spring action portion 140 of the U-ring 110 is brought into contact with the groove wall 138 of the interlocking groove 108, the invention is not limited to the aspect and the spring action portion 140 of the U-ring 110 may be brought into contact with the groove wall 137 of the ring attachment groove 121.

Fifth Embodiment

Figure 26A:
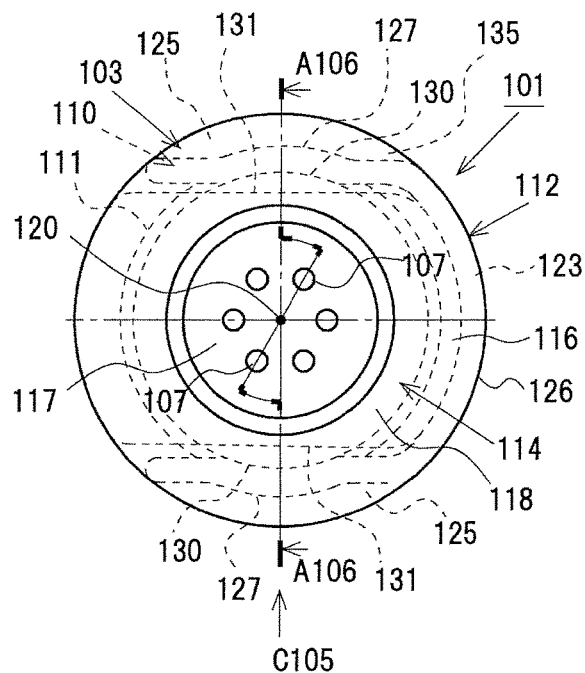
FIGS. 26A-26C illustrate an attachment structure of a nozzle plate according to a fifth embodiment of the invention.
Figure 26C:
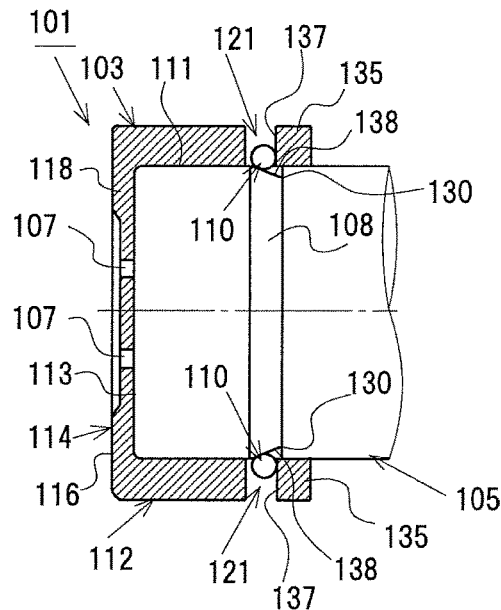
Figure 26B:
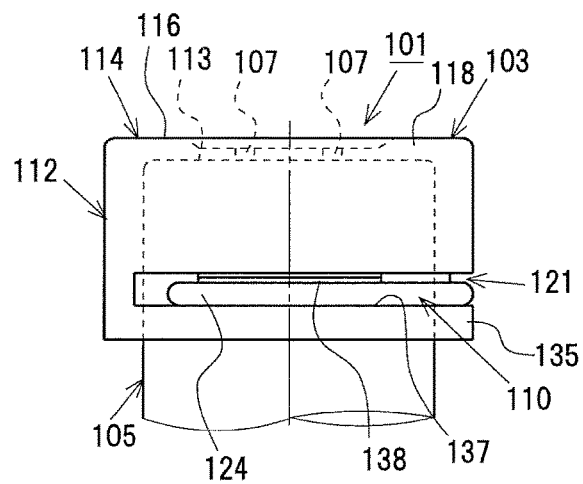
Figure 27A:
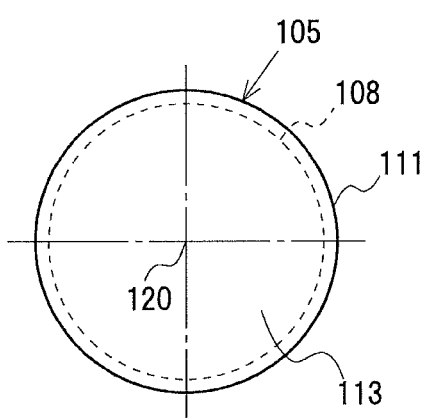
FIGS. 27A and 27B illustrate a valve body according to the fifth embodiment of the invention.
Figure 27B:
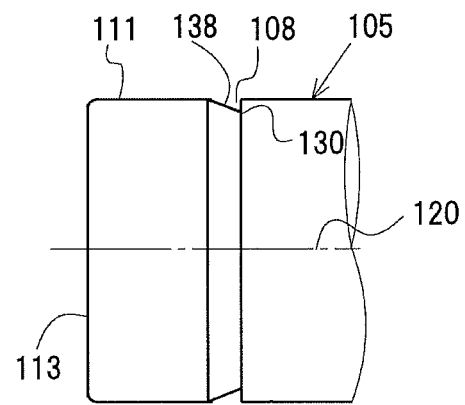

FIGS. 26 and 27 illustrate an attachment structure of the nozzle plate 103 according to a fifth embodiment of the invention. In the description of the attachment structure of the nozzle plate 103 according to the embodiment, components in FIGS. 26 and 27 the same as in the attachment structure of the nozzle plate 103 according to the third embodiment are given the same reference numerals and duplicate description as in the nozzle plate 103 according to the third embodiment is omitted.

As illustrated in FIGS. 26 and 27, in the attachment structure of the nozzle plate 103 according to the embodiment, the groove wall 138 of the interlocking projection 108 against which the U-ring 110 is pushed is an inclined plane. The groove width of the groove wall 138 as an inclined plane is extended toward the outer surface 111 of the valve body 105 from the groove bottom 130.

In the attachment structure of the nozzle plate 103 according to the embodiment, when the U-ring 110 is attached to the ring attachment groove 121 of the nozzle plate 103 after the nozzle plate 103 is press-fitted onto the valve body 105, the arm part 124 of the U-ring 110 is superposed between the groove wall (inclined plane) 138 of the interlocking groove 108 and the groove wall 137 of the ring attachment groove 121 while bending the U-ring supporting portion 135. Then, the elastic force used by the part of arm parts 124 and 124 of the U-ring 110 to clamp the valve body 105 and the elastic force of the U-ring supporting portion 135 act on the groove wall 138 of the interlocking groove 108 and the force (the inclined plane component force acting on the groove wall 138, which is the inclined plane of the interlocking groove 108) pushing the bottom wall part 114 of the nozzle plate 103 against the front end surface 113 of the valve body 105 is constantly applied.

In addition, in the attachment structure of the nozzle plate 103 according to the embodiment, when a difference in thermal expansion is generated between the valve body 105 of metal and the nozzle plate 103 of synthetic resin or manufacturing error is present in the nozzle plate 103 and the valve body 105, the U-ring 110 moves along the groove wall (inclined plane) 138 of the interlocking groove 108 and the U-ring supporting portion 135 is elastically deformed to absorb the difference in thermal expansion between the nozzle plate 103 and the valve body 105 and the manufacturing error of the nozzle plate 103 and the valve body 105 and the elastic force (the elastic force clamping the valve body 105) of the U-ring 110 acting on the groove wall (inclined plane) 138 of the interlocking groove 108 and the friction force applied between the cylindrical fitting part 112 and the valve body 105 counteract the force removing the nozzle plate 103 from the valve body 105. As a result, even when a difference in thermal expansion is generated between the valve body 105 of metal and the nozzle plate 103 of synthetic resin or manufacturing error is present in the valve body 105 and the nozzle plate 103, no space is generated between the bottom wall part 114 of the nozzle plate 103 and the front end surface 113 of the valve body 105 and, even if the injection pressure of fuel acts on the nozzle plate 103, the nozzle plate 103 is not removed from the valve body 105.

In the attachment structure of the nozzle plate 103 according to the embodiment, effects similar to those in the attachment structures of the nozzle plates 103 according to the third and fourth embodiments can be obtained.

[Modification 1 of Third Embodiment]

Figure 28:
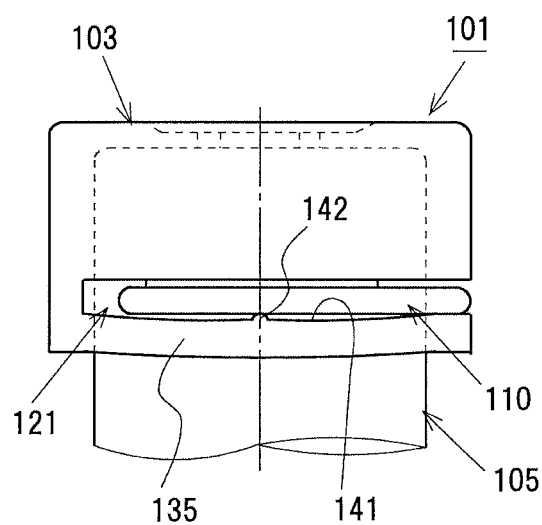
FIG. 28 is a side view illustrating the front end side of a fuel injection device according to modification 1 of the third embodiment of the invention and this drawing corresponds to FIG. 19B.

FIG. 28 illustrates modification 1 of the third embodiment. As illustrated in FIG. 28, the ring attachment groove 121 of the nozzle plate 103 may have a projection 142 in the part of a groove wall 141, close to the U-ring supporting portion 135, that corresponds to the window 131 (see FIG. 21) so that the projection 142 pushes the U-ring 110. In such a structure, the groove width of the ring attachment groove 121 can be extended, the friction resistance between the ring attachment groove 121 and the U-ring 110 can be reduced, and the U-ring 110 can be easily attached to the ring attachment groove 121. Although the projection 142 is hemispherical in the modification, the invention is not limited to the modification and the projection 142 may be of any shape as long as the contact area between the groove wall 141 and the U-ring 110 is small and the friction resistance during attachment of the U-ring 110 to the ring attachment groove 121 is small, and the groove wall 141 may be convexly curved in part.

[Modification 2 of Third Embodiment]

Figure 29A:
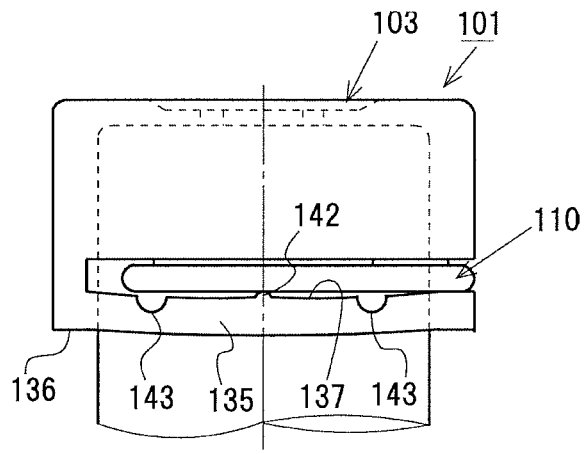
FIG. 29 is a side view illustrating the front end side of a fuel injection device according to modification 2 of the third embodiment of the invention and this drawing corresponds to FIG. 19B.
Figure 29B:
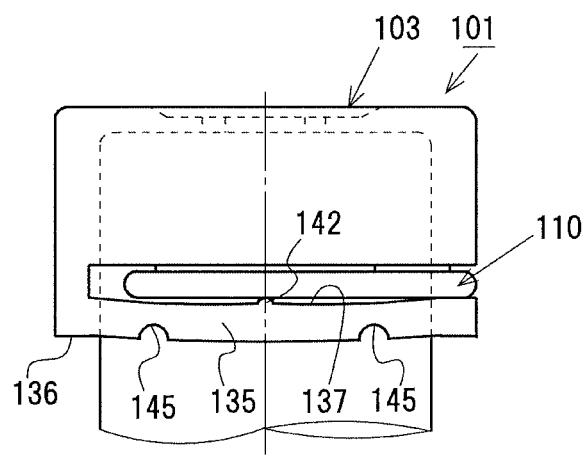
Figure 29C:
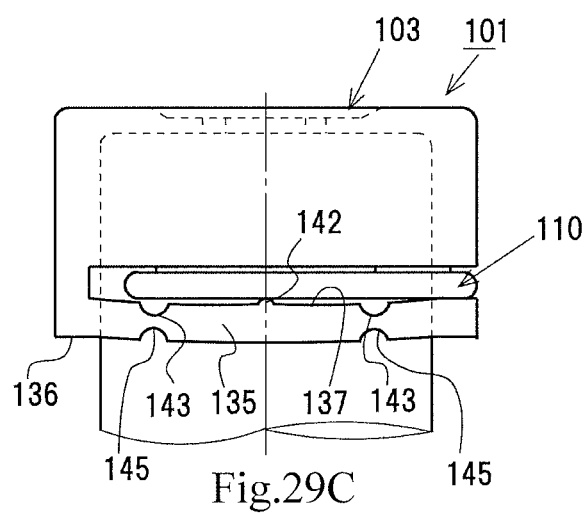

FIG. 29 illustrates modification 2 of the third embodiment. As illustrated in FIGS. 29A to 29C, on both sides of the part of the U-ring supporting portion 135 across which the U-ring supporting portion 135 makes contact with the U-ring 110, a strength adjustment groove 143 and a strength adjustment groove 145 (incision) having a substantially hemispherical shape may be formed so that the U-ring supporting portion 135 can be easily bent. In FIG. 29A, the strength adjustment grooves 143 and 143 are formed in the part of the U-ring supporting portion 135 close to the groove wall 137. In FIG. 29B, the strength adjustment grooves 145 are formed at the opening end 136 of the U-ring supporting portion 135. In FIG. 29C, the strength adjustment grooves 143 are formed on the groove wall 137 of the U-ring supporting portion 135 and the strength adjustment grooves 145 are formed at the opening end 136. Since the U-ring supporting portion 135 can be easily deformed in such a structure, the resistance during attachment of the U-ring 110 to the ring attachment groove 121 is reduced and the U-ring 110 can be easily attached to the ring attachment groove 121.

Modification 2 may also be applied to the U-ring supporting portion 135 according to the fourth embodiment, the U-ring supporting portion 135 according to the fifth embodiment, and the U-ring supporting portion 135 according to modification 1.

REFERENCE SIGNS LIST 1, 101: fuel injection device
3, 103: nozzle plate (fuel injection device nozzle plate)
4, 104: fuel injection port
5, 105: valve body
7, 107: nozzle hole
8: engaging projection (a part of interlocking means)
12, 112: cylindrical fitting part
13, 113: front end surface
14, 114: bottom wall part
20: arm part (elastically deformable portion)
38: interlocking groove (a part of interlocking means)
110: U-ring (a part of interlocking means)
135: U-ring supporting portion (elastically deformable portion)

What is claimed is:

1. A fuel injection device comprising:
a nozzle plate having a nozzle hole for atomizing and injecting fuel flowing from a fuel injection port, the nozzle plate having an interlocking groove including an axial groove portion and a lateral groove portion communicating with the axial groove portion and extending in a circumferential direction of the nozzle plate, the lateral groove portion having an open base end communicating with the axial groove portion and a closed terminal end opposite the base end; and
a metal valve body having a front end side to which the nozzle plate is attachable, the front end side being provided with the fuel injection port, the valve body having an outer periphery and an engaging projection protruding from the outer periphery,
wherein the nozzle plate includes a cylindrical fitting part into which the front end side of the valve body is fitted, and a bottom wall part formed so as to close a first end of the cylindrical fitting part, the bottom wall part abutting against a front end surface of the valve body and having the nozzle hole, a second end of the cylindrical fitting part being an open end, the axial groove portion of the interlocking groove extending in an axial direction of the cylindrical fitting part from the open end,
wherein the cylindrical fitting part and the bottom wall part are made of synthetic resin and formed integrally,
wherein the cylindrical fitting part of the nozzle plate has an integral arm part configured as an elastically-movable cantilever between the open end of the cylindrical fitting part and the lateral groove portion of the interlocking groove, the arm part having a lateral groove wall facing the lateral groove portion, the lateral groove wall having a recess formed therein for receiving the engaging projection, the recess being located between the base end and the terminal end of the lateral groove portion so as to be spaced apart a distance from both the base end and the terminal end of the lateral groove portion, the distance being equal to at least a lateral width of the engaging projection,
wherein the cylindrical fitting part is fitted onto the front end side of the valve body until the bottom wall part abuts against the front end surface of the valve body such that the engaging projection of the valve body engages with the interlocking groove of the nozzle plate and is seated in the recess of the lateral groove wall of the arm part such that an elastic force of the arm part urges and presses the bottom wall part of the nozzle plate against the front end surface of the valve body, and
wherein the axial groove part of the interlocking groove has a width at least as large as the lateral width of the engaging projection to allow the engaging projection to pass through the axial groove part as the cylindrical fitting part is fitted onto the front end side of the valve body.

2. The fuel injection device according to claim 1, wherein the interlocking groove is one of a pair of interlocking grooves formed at intervals of 180 degrees in the circumferential direction of the nozzle plate, and the engaging projection is one of a pair of engaging projections formed at intervals of 180 degrees in a circumferential direction of the valve body, each of the pair of engaging projections engaging a respective one of the pair of interlocking grooves.

3. The fuel injection device according to claim 1, wherein the recess has a semi-circular cross section and is formed in a surface of the lateral groove wall to allow the engaging projection to seat therein.

4. The fuel injection device according to claim 1, wherein a portion of the lateral groove wall between the terminal end of the lateral groove portion and the recess is inclined so as to smoothly guide the engaging projection from the terminal end of the lateral groove portion to the recess.

5. The fuel injection device according to claim 4, wherein an inclined portion of the lateral groove wall is connected to the axial groove by a curved surface.

6. The fuel injection device according to claim 1, wherein the lateral groove wall has a rotation preventing projection projecting in an axial direction of the cylindrical fitting part, the rotation preventing projection being located between the recess and the base end of the lateral groove portion.

\* \* \* \* \*